(12) United States Patent
Hasegawa et al.

(10) Patent No.: US 8,811,233 B2
(45) Date of Patent: Aug. 19, 2014

(54) TOPOLOGY DETECTION METHOD AND TOPOLOGY DETECTION APPARATUS

(75) Inventors: Yohei Hasegawa, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 13/128,731

(22) PCT Filed: Oct. 22, 2009

(86) PCT No.: PCT/JP2009/068184
§ 371 (c)(1),
(2), (4) Date: May 23, 2011

(87) PCT Pub. No.: WO2010/055756
PCT Pub. Date: May 20, 2010

(65) Prior Publication Data
US 2011/0216673 A1   Sep. 8, 2011

(30) Foreign Application Priority Data
Nov. 14, 2008  (JP) .................................. 2008-291812

(51) Int. Cl.
*H04L 12/28* (2006.01)
(52) U.S. Cl.
USPC ......................................... 370/256; 370/255
(58) Field of Classification Search
None
See application file for complete search history.

(56) References Cited

U.S. PATENT DOCUMENTS 6,256,295 B1 * 7/2001 Callon .......................... 370/254
8,259,619 B2 * 9/2012 Hasegawa et al. ............ 370/255

FOREIGN PATENT DOCUMENTS

| JP | 9-186716 A | 7/1997 |
| JP | 2002252625 A | 9/2002 |
| JP | 2004056465 A | 2/2004 |
| WO | 2008142961 A | 11/2008 |

OTHER PUBLICATIONS

International Search Report for PCT/JP2009/068184 mailed Jan. 12, 2010.

* cited by examiner

*Primary Examiner* — Ayaz Sheikh
*Assistant Examiner* — Blanche Wong
(74) *Attorney, Agent, or Firm* — Sughrue Mion, PLLC

(57) ABSTRACT

A topology detection apparatus includes, in a network having a tree-type topology: a route overlap judgment part that judges an existence or non-existence of an overlap between: a first route between terminals whose connection position are known; and a second route between a terminal whose connection position is known and a terminal whose connection position is unknown; and a topology detection part which determines the network topology based on the existence or non-existence of the first route and the second route.

14 Claims, 20 Drawing Sheets

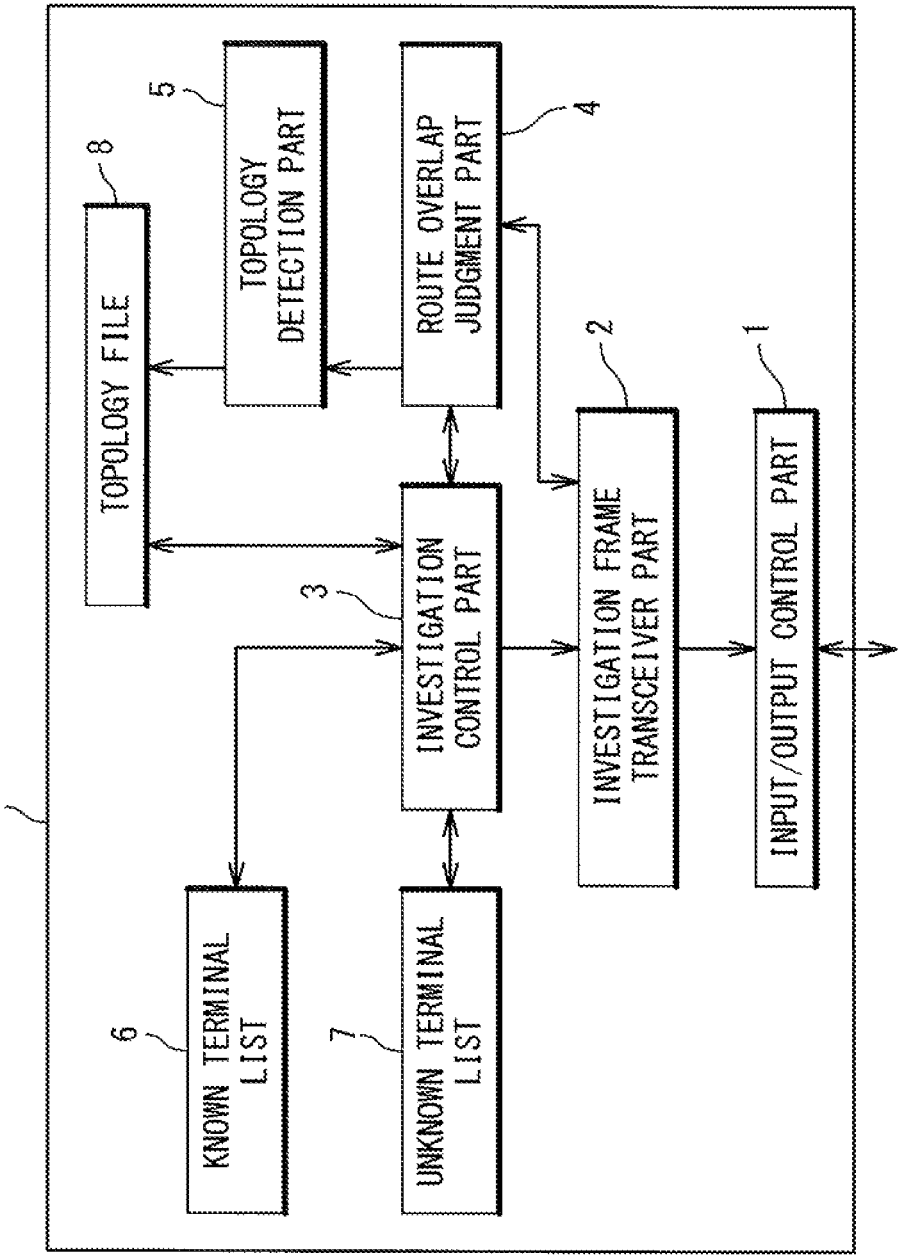

TOPOLOGY DETECTION METHOD AND TOPOLOGY DETECTION APPARATUS

TECHNICAL FIELD

The present invention relates to a determination method and apparatus of a network topology (a connection relation between terminals and switches in a network).

BACKGROUND ART

In recent years, in order to detect a trouble portion and the like in a network, it is often required to recognize the connection relation (a network topology: hereafter, refer-red to as a topology) between terminals, switches and the like, which exist inside the network, in a network management. In an IP (Internet Protocol) router used in the Internet, typically, a network management function that can be used to determine the topology is installed in many cases. Thus, it is possible to easily determine the topology. On the other hand, in LAN (Local Area Network) such as IEEE802.3 (Ethernet (Registered Trademark)) and the like, low cost switches are used in many cases. In such switches, the management function for detecting the topology is not installed, which makes the determination of the topology difficult in many cases. As conventional techniques for detecting the topology in the LAN, there are following methods.

As a first conventional technique, a method for collecting connection information from switches and determining the topology in accordance with this information is generally known. The first conventional technique is described in, for example, Japanese Patent Application Publication JP-A-Heisei, 9-186716. In the technique described in Japanese Patent Application Publication JP-A-Heisei, 9-186716, each of the switches in the network collects addresses of the terminals connected to its own interface and other switches to determine the topology.

As a second conventional technique, there is a method in which the routers/switches which are passed by routes between terminals are investigated in turn to determine the topology. Conventionally, it is generally known that at the IP level, the topology can be estimated by a function which can detect routers which are passed in a route between, terminals in turn through the use of Traceroute and the like. On the other hand, even in the case of the Ethernet (Registered Trademark), similarly to the Traceroute, a function in which a response of a frame is obtained in the switch is standardized as IEEE802.1ag. Thus, the topology can be easily estimated by using the method similar to the Traceroute.

As a third conventional technique, there is a method in which a certain terminal transmits a packet to a plurality of different terminals and in each of the terminals receiving this packet, a correlative relation between qualities (throughputs, delays, packet losses and the like) obtained in the packet in the network is investigated, thereby determining the topology.

However, in the first and second conventional techniques, there is a problem in which, when network equipment which cannot use the management function used to detect the topology and the like exists in the network, the topology in that portion cannot be detected. In particular, the LAN is typically provided with low cost switches that do not have a management function. Such a low cost switch cannot use the management function and the IEEE802.1ag in many cases. Thus, in the LAN of the typical (low cost) configuration, it is difficult to detect the topology.

Further, in the third conventional technique, in order to determine the topology, it is required to install a topology detecting function at all of the terminals in the network. Thus, for establishing a network in which the topology can be detected, there is a problem that its cost becomes expensive.

CITATION LIST

Patent Literature

[PTL 1]
Japanese Patent Application Publication JP-A-Heisei, 9-186716

SUMMARY OF INVENTION

An object of the present invention is to provide a topology detection method and a topology detection apparatus in which it is possible to detect the topology, even when not all of the switches in the network have a special function for detecting the topology.

A topology detection method according to the present invention includes, in a network having a tree network topology: a step of selecting a first route between a first terminal and a second terminal and a second route between a third terminal and a fourth terminal; a step of determining a network topology based on an existence or non-existence of an overlap between the first route and the second route; and a step of judging an existence or non-existence of an overlap of the first route and the second route. The step of judging the existence or non-existence of the overlap includes: a step of instructing a switch on the second route to learn to transfer a frame addressed to a predetermined terminal to the third terminal; a step of instructing a switch on the first route to learn to transfer the frame addressed to the predetermined terminal to the first terminal after the learning of the switch on the second route; a step of transmitting the frame addressed to the predetermined terminal from the fourth terminal; and a step of judging the overlap of the first route and the second route based on a terminal which receives the frame addressed to the predetermined terminal.

The step of selecting the first route and the second route includes: a step of selecting a known network topology including the first terminal, the third terminal, and the fourth terminal; and a step of extracting the second terminal whose connection position in the known network is unknown as an unknown terminal. The step of determining the network topology includes: detecting the connection position of the unknown terminal to the known network topology based on the existence or non-existence of the overlap between the first route and the second route.

In the known network topology, the first terminal, the third terminal, and the fourth terminal are connected to a first switch via respective networks being different from each other. The step of determining the network topology includes: a step of detecting a network arranged between the first switch and the unknown terminal based on the existence or non-existence of the overlap of the first route and the second route.

When the first route and the second route do not overlap, the step of determining the network topology includes: a step of judging that the unknown terminal is connected to the first switch via a network arranged between the first switch and the first terminal.

On the other hand, when the first route and the second route overlap, the step of determining the network topology includes: a step of judging that the unknown terminal is connected to the first switch via a network other than a network arranged between the first switch and the first terminal.

The step of determining the network topology includes: a step of judging that the unknown terminal is connected to the first switch via a new network when the unknown terminal is judged to be not connected to any networks connected to the first switch in the known network topology.

A topology detection apparatus includes, in a network having a tree network topology: a route overlap judgment part configured to judge an existence or non-existence of an overlap between a first route between a first terminal and a second terminal and a second route between a third terminal and a fourth terminal; and a topology detection part configured to determine a network topology based on an existence or non-existence of an overlap between the first route and the second route. The route overlap judgment part is configured to select a known network topology including the first terminal, the third terminal, and the fourth terminal, and to extract the second terminal whose connection position in the known network is unknown as an unknown terminal, and the topology detection part is configured to detect the connection position of the unknown terminal to the known network topology based on the existence or non-existence of the overlap between the first route and the second route.

A topology detect ion apparatus according to a first embodiment further includes an investigation frame transceiver part. The route overlap judgment part is configured to issue a transmission request to instruct the third terminal to transmit a first frame whose source address is an address of a predetermined terminal to the fourth terminal. The investigation frame transceiver part is configured to transmit a second frame whose source address is the address of the predetermined terminal to the second terminal after the issuing of the transmission request. The route overlap judgment part is configured to judge that the first route and the second route are overlapped to each other when the investigation frame transceiver part receives a third frame addressed to the predetermined terminal transmitted from the fourth terminal.

According to the topology detection method and the topology detection apparatus according to the present invention, it is possible to detect the topology, even when not all of the switches in the network have a special function for detecting the topology.

BRIEF DESCRIPTION OF DRAWINGS

The above-mentioned objects, effects and features of the invention would be more evident from the descriptions of the exemplary embodiments in linkage to the accompanying drawings, in which:

FIG. 1 is a configuration view showing a configuration of a first exemplary embodiment of the topology detection apparatus according to the present invention;

DESCRIPTION OF EMBODIMENTS

Figure 2A:
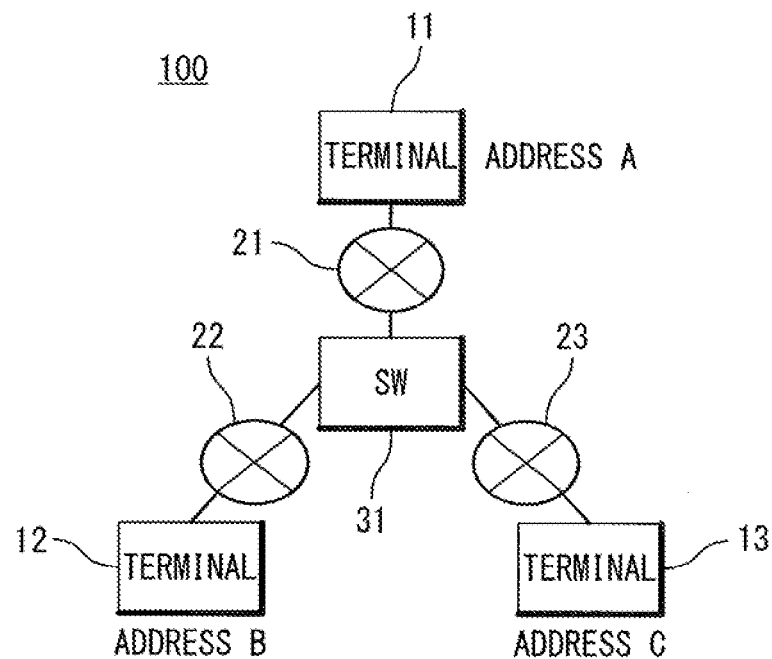
FIG. 2A is a view showing a known topology used to detect the topology, in the first exemplary embodiment.
Figure 2B:
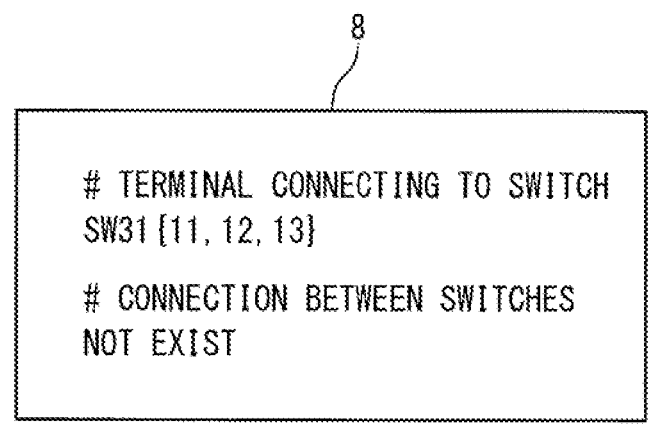
FIG. 2B is a view showing a topology file based on the topology shown in FIG. 2A.

Some exemplary embodiments of the topology detection method and the topology detection apparatus according to the present invention will be described below with reference to the accompanying drawings. In an exemplary embodiment, a method of detecting the topology in a LAN that contains a switch compliant with IEEE802.1 is described as an example. The IEEE802.1 network has the topology of a tree type in which no loop exists in networks (generally, even if a loop exists physically, a logical topology of the tree type is configured). In such a network, when switches having no influence on route branches are omitted, for example, as shown in FIG. 2A and FIG. 2B, a network including three terminals (terminals 11, 12 and 13) can always be represented by the topology connected to one switch (switch 31). According to a topology detection method of a present invention, a connection position between an unknown terminal and a known topology is detected by extracting one set (two) of routes from the known topology including such three terminals and an unknown terminal and verifying whether or not the one set of the routes includes a common switch. Hereafter, the state that one set of routes includes a common switch is represented as "the routes overlap." Further, the switch compliant with the IEEE802.1 learns a transfer direction of a frame, in accordance with a transmission source address stored in the frame transferred in the network, and the transfer direction of the frame is determined in accordance with a destination address. For this reason, in a present invention, the switch is instructed to learn the transfer direction which is different from a normal operation, and the existence or non-existence of the overlap between the one set of the routes is consequently verified. The detail will be described later.

1. First Exemplary Embodiment

A first exemplary embodiment of the topology detection method and the topology detection apparatus according to the present invention will be described below with reference to FIG. 1 to FIG. 11B. In the first exemplary embodiment, a method of determining the topology provided with four terminals 11, 12, 13 and 90 included in a LAN is described as one example. Here, the description is carried out under an assumption that the topology of the network including the three terminals 11, 12 and 13 shown in FIG. 2A is defined as the known topology (hereafter, referred to as a known topology 100) and the terminal whose connection relation to the known topology 100 is not detected is defined as the terminal 90. With reference to FIG. 2A and FIG. 2B, the terminal 11, the terminal 12 and the terminal 13 are connected to a switch 31 through a network 21, a network 22 and a network 23, respectively. As for the switch 31 whose terminals are connected to respectively different networks, only one switch 31 can exist in the tree network. Further, the respective terminals and MAC addresses are correlated in advance in the switch 31, and the respective terminals are assumed to be able to communicate between them.

Here, each of the terminals (terminals 11, 12, 13 and 90) in the LAN in the first exemplary embodiment contains a topology detection apparatus 10 shown in FIG. 1. The topology detection apparatus 10 contains an input/output control part 1, an investigation frame transceiver part 2, an investigation control part 3, a route overlap judgment part 4 and a topology detection part 5. Further, the topology detection apparatus 10 contains a storage device (not shown), which stores a known terminal list 6, an unknown terminal list 7 and a topology file 8. The input/output control part 1 controls an input/output of a frame/packet from/to networks. The investigation frame transceiver part 2 generates, transmits and receives an investigation frame to investigate the overlap between routes. The investigation control part 3 manages an investigation procedure that will be described later and instructs a transmission of a frame to another investigation terminal and a report of the reception result. The route overlap judgment part 4 judges the overlap between one set of routes on the basis of the reception state of the investigation frame. The topology detection part 5 determines the topology from the overlap information of the routes and updates the known topology 100 written in the topology file 8.

The known terminal list 6 records a list of the known terminals and the switches, which are included in the known topology 100. In the present case, the terminals 11, 12 and 13 and the switch 31 are recorded in the known terminal list 6. The unknown terminal list 7 records a list of the terminal whose connection position is unclear although the existence in the network is known. In the present case, the terminal 90 is recorded in the unknown terminal list 7. The topology file 8 records the known topology 100. Here, as the topology file 8, the configuration elements representing the known topology 100 shown in FIG. 2A and the connection relations between the respective configuration elements are recorded as shown in FIG. 2B. The topology file 8 records, for example, a terminal name connected for each switch and the connection state between switches (the existence or non-existence of a connection between the switches, and the names of connected switches).

A topology detection method according to the present invention will be described below. Hereafter, an address of the terminal 11 (IP address, MAC address) is referred to as A for convenience, and addresses of the terminals 12, 13 are similarly referred to as B, C, respectively. Further, in this exemplary embodiment, it is assumed that the terminal 11 serves as a host terminal for judging the overlap between routes and issues various instructions to the terminals 12, 13. Moreover, the terminals 11, 12 and 13 are assumed to be registered as 11, 12 and 13, respectively, in the known terminal list 6 in the terminal 11.

Figure 3:
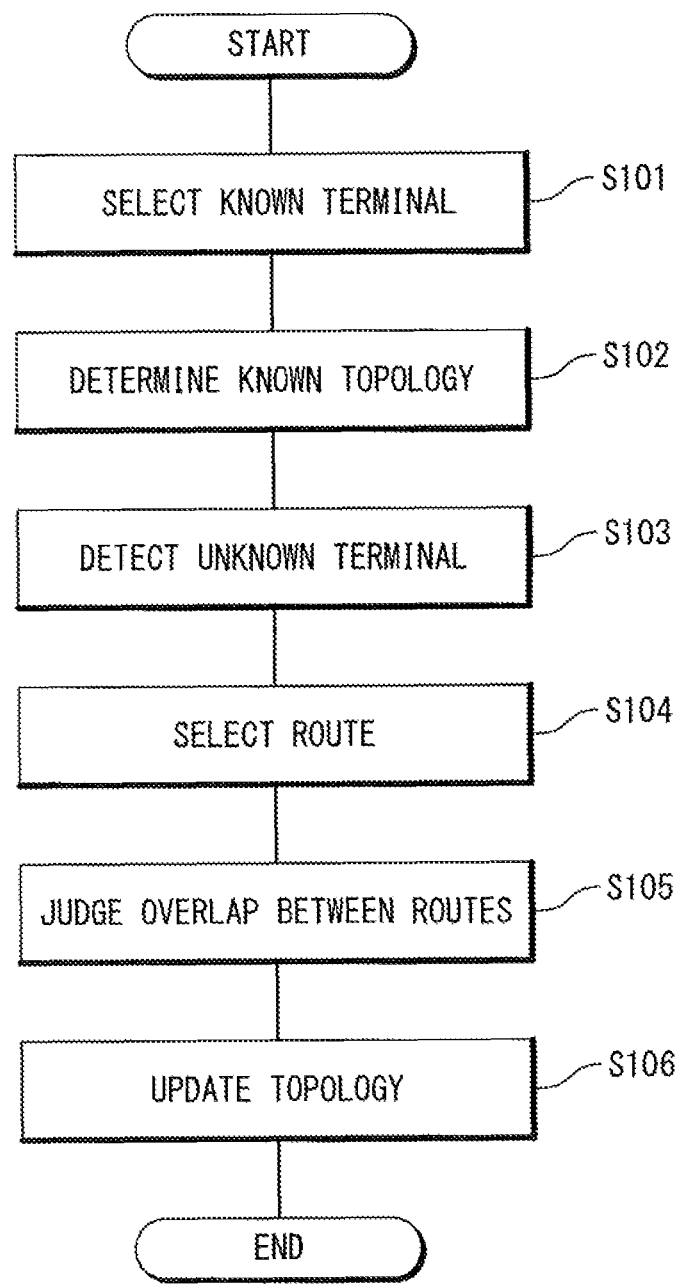
FIG. 3 is a flowchart showing a schema of a topology detection method according to the present invention.
Figure 4:
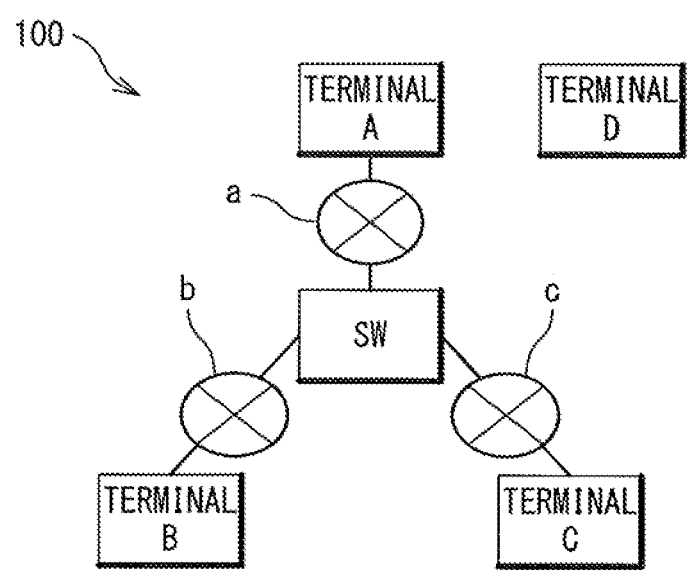
FIG. 4 is a view showing a terminal whose connection position in the known topology used to detect the topology is unknown, in the first exemplary embodiment.

At first, the schema of the topology detection method is described with reference to FIG. 3 and FIG. 4. The terminal 11 determines the known topology 100 that includes three terminals A, B and C connected to a switch SW as shown in FIG. 4 (Steps S101, S102) and extracts an unknown terminal D from the unknown terminal list 7 (Step S103). The terminal 11 detects the connection position of the unknown terminal D to the known topology 100, in accordance with the existence or non-existence of the overlap between the terminals A, B and C in the known topology 100 and the unknown terminal D and determines the new topology (Steps S104 to S106). Hereafter, a route between the terminal A and the terminal B is referred to as a route AB, a route between the terminal A and the terminal C is referred to as a route AC, a route between the terminal A and the terminal D is referred to as a route AD, a terminal between the terminal B and the terminal C is referred to as a route BC, a route between the terminal B and the terminal D is referred to as a route BD, and a route between the terminal C and the terminal D is referred to as a route CD.

A specific example of the topology detection method will be described below with reference to FIG. 2A to FIG. 4. The investigation control part 3 in the terminal 11 selects the terminal 11 that is the own terminal and the three terminals of any two of the other terminals from the known terminal list 6 (Step S101). In the present case, the terminal 11, the terminal 12 and the terminal 13 are selected as the terminals A, B and C, respectively. Next, the terminal 11 determines the known topology 100 in accordance with the selected terminals (Step S102). In detail, the investigation control part 3 in the terminal 11 sends the list of the three terminals to the topology detection part 5 and requests to generate the topology. When the topology file 8 is empty, the topology detection part 5 defines the switch 31 as the switch SW that is connected to the three terminals 11, 12 and 13 and determines the known topology 100 shown in FIG. 2A. The topology detection part 5 records the information, which represents the determined known topology 100, in the topology file 8. Here, when a known topology exists in the topology file 8, the steps S101, S102 are skipped.

Next, the investigation control part 3 in the terminal 11 judges whether or not the unknown terminal list 7 stores terminal information and if it is stored, extracts the unknown terminal. Then, the processing flow proceeds to a route selection process (Step S104) (Step S103). Here, if the known terminal list 6 does not store the terminal information, the process is terminated. In this exemplary embodiment, since the terminal 90 exists in the unknown terminal list 7, the terminal 90 is selected as the unknown terminal D, and the processing flow proceeds to the step S104.

In order to determine the position of the unknown terminal 90, the terminal 11 selects the routes that can be routed between the terminals 11, 12, 13 and 90 and investigates the overlap between each of the sets of two routes (Steps S104, S105). The route overlap judgment part 4 in the terminal 11 selects a route set being an investigation target from the plurality of routes (Step S104). Here, the route overlap judgment part 4 selects a set of a route between the unknown terminal and a known terminal and a route between other known terminals. As those route sets, there are the following three sets. That is, 1: the set of the route AD (between the terminal 11 and the terminal 90) and the route BC (between the terminal 12 and the terminal 13), 2: the set of the route AC (between the terminal 11 and the terminal 13) and the route BD (between the terminal 12 and the terminal 90, and 3: the route set of the route AB (between the terminal 11 and the terminal 12) and the route CD (between the terminal 13 and the terminal 90) are selected. When the route sets targeted for the judgment of the overlap between the routes is determined, the investigation frame transceiver part 2 in the terminal 11 transmits and receives information to and from the other terminals 12, 13 and 90. At this time, the route overlap judgment part 4 in the terminal 11 judges the overlaps between the foregoing respective route sets, in accordance with the reception state of the information from the other terminals (Step S105).

The topology detection part 5 in the terminal 11 detects the connection position in the known topology 100 of the unknown terminal 90 on the basis of the overlap judgment results in the respective route sets to generate the new known topology 100 (Step S106). In detail, when there is a set of routes that did not overlap, the topology detection part 5 judges that an unknown switch exits in the direction of the terminal forming the route between it and the unknown terminal 90 and then the two terminals are connected to the switch. Or, when all of the sets of routes overlap, the unknown terminal 90 is judged to be connected through an unknown link to the switch 31. The topology detection part 5 updates the topology file 8 in accordance with the new known topology 100. Further, the topology detection part 5 may transfer the updated topology file 8 to the other terminals 12, 13 and 90.

Figure 5:
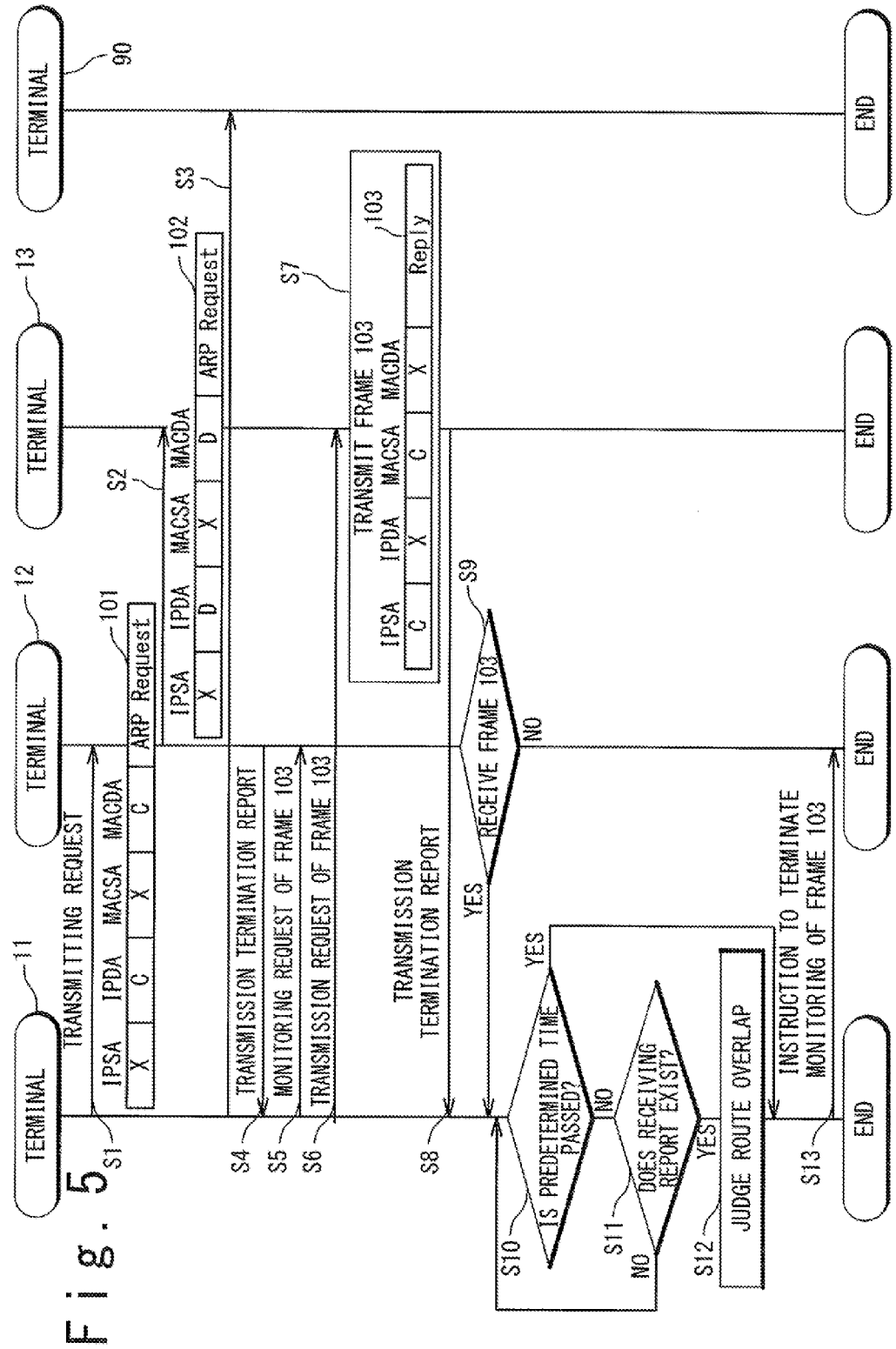
FIG. 5 is a sequence diagram showing the first exemplary embodiment of an operation for investigating an overlap state of routes, in the network according to the present invention.
Figure 6:
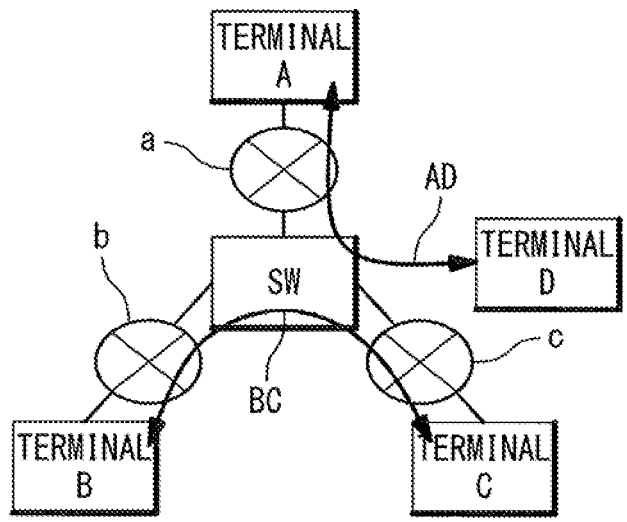
FIG. 6 is a view showing a case in which a route AD and a route BC overlap.
Figure 7:
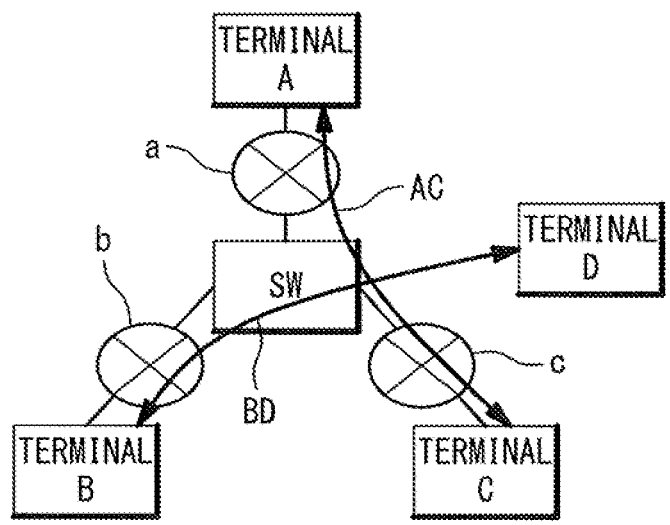
FIG. 7 is a view showing a case in which a route AC and a route BD overlap.
Figure 8:
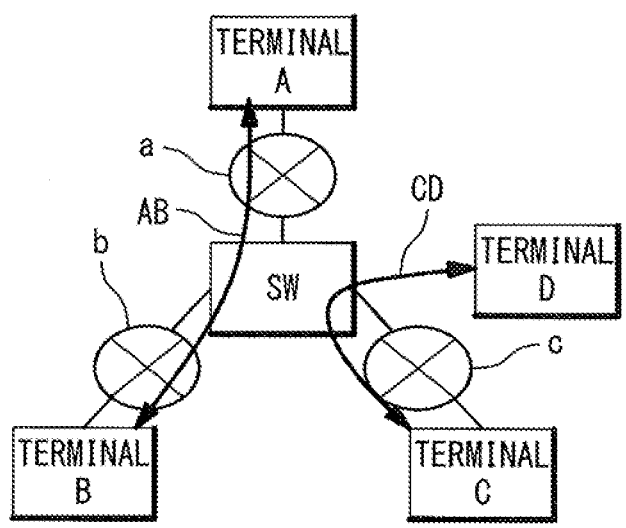
FIG. 8 is a view showing a case in which a route AB and a route CD overlap.

Next, the overlap judging process for the route set at the step S105 will be described below in detail with reference to FIG. 5 to FIG. 11B. Here, a method of judging the overlap between the route AD between the terminal 11 and the terminal 90 and the route BC between the terminal 12 and the terminal 13 is described as one example. FIG. 5 is a sequence diagram showing the operation for the overlap judging process between the route AD and the route BC in the first exemplary embodiment.

In the topology detection method in the first exemplary embodiment, the terminal 11 instructs the switch on the route AD and the switch on the route BC to learn the MAC address for investigation. In this state, the terminal 11 instructs the terminal 13 to transmit an investigation frame to the terminal 12 and judges the existence or non-existence of the overlap between the route AD and the route BC on the basis of a reception destination of the frame. This will be described below in detail.

With reference to FIG. 5, the route overlap judgment part 4 in the terminal 11 issues a transmission request of the frame to set an address X for investigation to the switch on the route BC, to the terminal 12 (Step S1). The investigation control part 3 in the terminal 12 transmits a frame 101 to the terminal 13, in response to the transmission request from the terminal 11 (Step S2). Here, the frame 101 is the frame that includes a unicast ARP (Address Resolution Protocol) request, and the investigation address X is set as a transmission source address (IP address, MAC address), and an address C of the terminal 13 is set as a destination address (IP address, MAC address). Consequently, the switch 31 on the route from the terminal 12 to the terminal 13 from the terminal 12 learns to transfer the frame whose destination is the investigation address X, to the direction of the terminal 13. The investigation address X is preferred to be an address that is not used in the network targeted to detect the topology.

Next, the route overlap judgment part 4 in the terminal 11 requests the investigation frame transceiver part 2 to transmit a frame 102 for the investigation to the terminal 90 (Step S3). Here, the frame 102 includes the unicast ARP request, the investigation address X is set as the transmission source address (IP address, MAC address), and an address D of the terminal 90 is set as the destination address (IP address, MAC address). Consequently, when a switch is located on the route AD to the terminal 90 from the terminal 11, the switch learns to transfer the frame whose destination is the investigation address X, to the direction of the terminal 11.

The terminal 12 issues a transmission completion report of the frame 101 to the terminal 11 (Step S4). The route overlap judgment part 4 in the terminal 11, when receiving the transmission completion report, issues a frame monitoring request to the terminal 12 (Step S5). When receiving a frame 103, the terminal 12 is controlled to report the receiving to the terminal 11, in accordance with the frame monitoring request. At this time, the route overlap judgment part 4 similarly issues the frame monitoring request to the investigation frame transceiver part 2. When receiving the frame 103, the investigation frame transceiver part 2 in the terminal 11 is controlled to report the receiving to the terminal 11, in accordance with the frame monitoring request.

Subsequently, the route overlap judgment part 4 in the terminal 11 issues a frame transmission request to transmit the frame 103 addressed to the investigation address X, to the terminal 13 (Step S6). The investigation control part 3 in the terminal 13 sends the frame 103 in response to the frame transmission request from the terminal 11, and reports a transmission completion to the terminal 11 (Steps S7, S8).

The terminal 12, when receiving the frame 103, reports the reception of the frame 103 to the terminal 11 (Step S9 Yes). Also, the terminal 12 monitors the reception of the frame 103, until the terminal 11 issues a monitoring termination instruction.

The route overlap judgment part 4 in the terminal 11 accepts the reception report of the frame 103, for a predetermined time after the reception of the transmission completion report at the step S8 (Steps S10 No, S11). When the reception report is inputted in this period (Step S10 No, S11 Yes), the route overlap judgment part 4 in the terminal 11 detects the terminal receiving the frame 103 in accordance with the source of the report of the reception, and judges the overlap between the routes (Step S12). On the other hand, when the reception report is not received within the predetermined time, the terminal 11 terminates the overlap judging process and issues a frame monitoring termination instruction to the terminal 12 and the investigation frame transceiver part 2 (Step S10 Yes, Step S13).

When the content instructed to be learned by the switch on the route BC at the step S1 is changed by the frame 102 transmitted at the step S3, the frame 103, which is transmitted by the terminal 13 and addressed to the investigation address X, is received by the terminal 11. This indicates that the switch on the route BC and the switch on the route AD are identical. For this reason, at the step S11, the route overlap judgment part 4 in the terminal 11, when receiving the reception report of the frame 103 from its own investigation frame transceiver part 2, judges that the route AD between the terminal 11 and the terminal 90 and the route BC between the terminal 12 and the terminal 13 overlap.

On the other hand, when the content that is instructed to be learned by the switch on the route BC at the step S1 is not changed by the frame 102 transmitted at the step S3, the frame 103, which is transmitted by the terminal 13 and addressed to the investigation address X, is received by the terminal 12. For this reason, at the step S11, the route overlap judgment part 4 in the terminal 11, when receiving the reception report of the frame 103 from the terminal 12, judges that the route AD and the route BC do not overlap.

The route overlap judgment part 4, after sending the result of the overlap judgment to the topology detection part 5, issues the frame monitoring termination instruction to the terminal 13 and the investigation control part 3 (Step S13). The terminal 13 and the investigation control part 3 in the terminal 11 stop monitoring the frame 103 in response to the frame monitoring termination instruction. The frame monitoring process in the terminal 13 and the investigation control part 3 in the terminal 11 may be set to be terminated when a predetermined time is passed.

As explained above, it is possible to judge the existence or non-existence of the overlap between the route AD and the route BC. Similarly, it is possible to judge the existence or non-existence of the overlap in the other route sets. According to the present invention, by using the MAC address learning function that is generally used in switches, it is possible to know the overlap of the routes between the unknown terminal 90 and the known terminals 11, 12 and 13. Here, under the assumption that the terminal 11 serves as the host terminal, the transfers of the data from the respective terminals are controlled. However, even if they are controlled by the other terminal, the processing is similarly executed. Also, this may be executed such that the host terminal is changed to another terminal in response to the routes whose overlap is investigated.

The topology detecting process of the topology detection part 5 will be described below in detail with reference to FIG. 5 to FIG. 11B. The topology detection part 5 uses the known topology 100, which includes the terminals A, B and C as shown in FIG. 4, and the unknown terminal D, to detect the connection position between the unknown terminal D and the known topology, from the overlap of the routes between the terminals. In the present case, the terminals 11, 12, 13 and 90 and the networks 21, 22 and 23 are assumed to be the terminals A, B, C and D and networks a, b and c, respectively, and the switch 31 is assumed to be the switch SW to detect the topology.

In the known topology 100, the portion to which the terminal D is possibly connected is one of the networks a, b and c and the switch SW. The route that links two terminals among the three terminals A to C always passes through three portions among the four portions of the networks a, b and c and the switch SW. At this time, when there is no overlap between the route between focused two terminals among the three terminals A to C and the route between the remaining terminal and the terminal D, the portion to which the terminal D is connected is limited to one. On the other hand, when there is an overlap between the two routes, it is at least known that the two routes pass through the known switch SW. For example, with reference to FIG. 6, the route BC between the terminal B and the terminal C passes through the three portions of the networks b, c and the switch SW and does not pass through the network a. At this time, when there is no overlap between the route BC from the terminal B to the terminal C and the route AD between the remaining terminal A and terminal D, the portion to which the terminal D is connected is limited to the network a. On the other hand, when there is an overlap between the route BC and the route AD, it is known that the route AD between the terminal A and the terminal D passes through at least the switch SW, and the terminal D is connected to the network a. Similarly, when the overlap between the route AB between the terminal A and the terminal B and the route CD between the terminal C and the terminal D or the overlap between the route AC between the terminal A and the terminal C and the route BD between the terminal B and the terminal D is investigated, the portion to which the terminal D is connected is known. In this way, when the terminal D is connected to one of the networks a, b and c, there exists a route set that does not overlap. Thus, by detecting the route set that does not overlap, it is possible to detect the connection position of the terminal D. Further, when all of the three route sets overlap, the position to which the terminal D is connected is limited to the switch SW.

As mentioned above, the topology detection part 5 detects the connection position of the unknown terminal D to the known topology 100, in accordance with the overlap judgment result of the routes outputted by the route overlap judgment part 4, and determines the new topology.

Figure 9A:
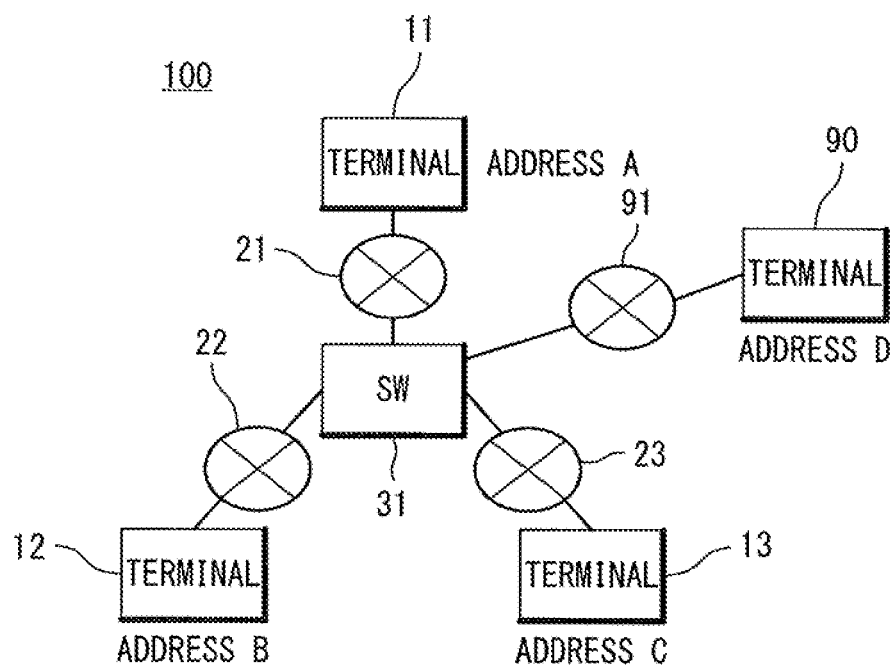
FIG. 9A is a view showing the topology when all of the route AD and the route BC, the route AC and the route BD, and the route AB and the route CD overlap.
Figure 9B:
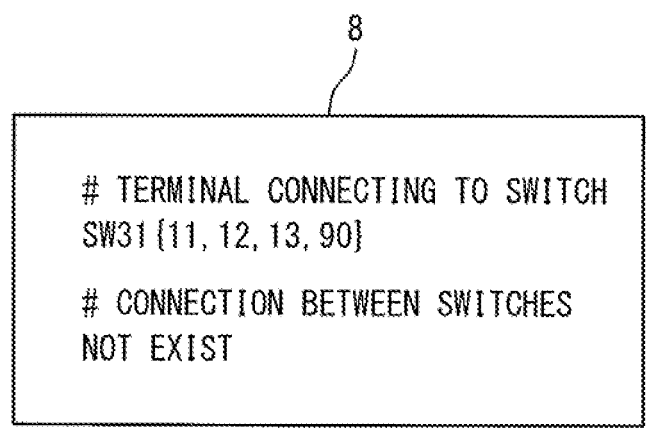
FIG. 9B is a view showing the topology file based on the topology shown in FIG. 9A.

For example, when it is judged that the route AD and the route BC overlap (refer to FIG. 6), the route AC and the route BD overlap (refer to FIG. 7) and the route AB and the route CD overlap (refer to FIG. 8), the topology detection part 5 detects that the connection position of the unknown terminal 90 is the switch 31 and updates the topology file 8 so that the topology in which the terminal 90 connected through a network 91 to the switch 31 is added is the new known topology 100 (refer to FIG. 9A and FIG. 9B).

Figure 10:
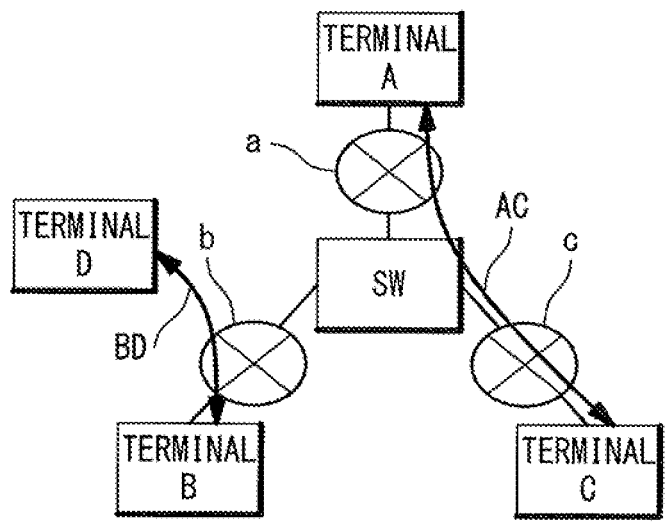
FIG. 10 is a view showing a case in which the route AC and the route BD do not overlap.
Figure 11A:
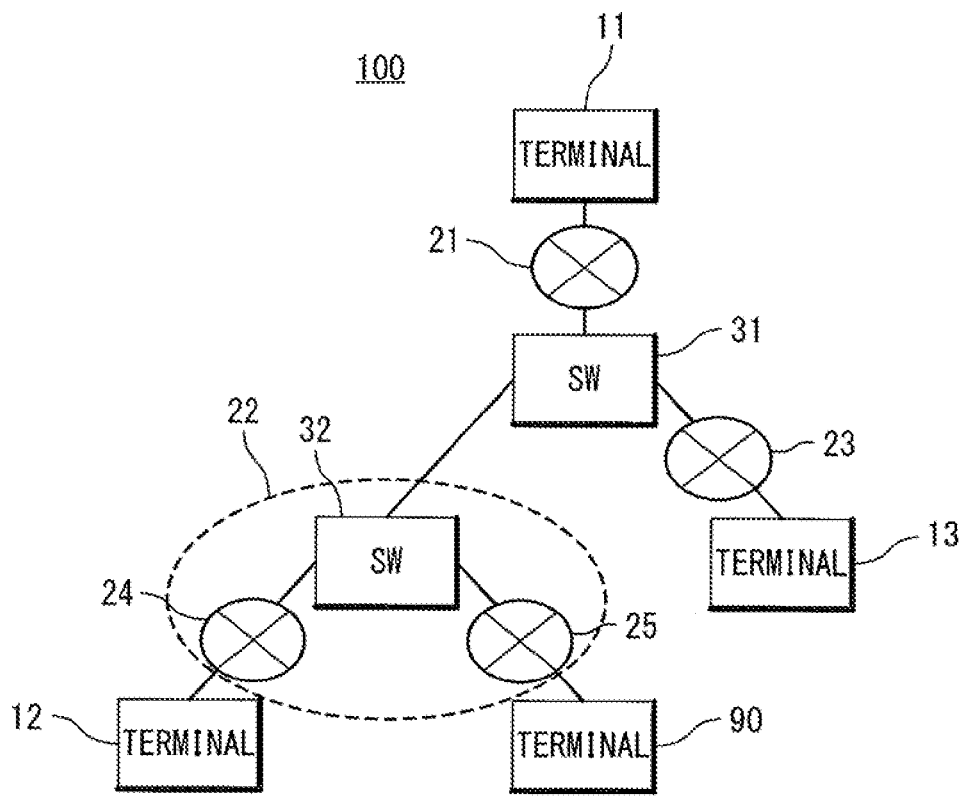
FIG. 11A is a view showing the topology when the route AD and the route BC, and the route AB and the route CD overlap, and the route AC and the route BD do not overlap.
Figure 11B:
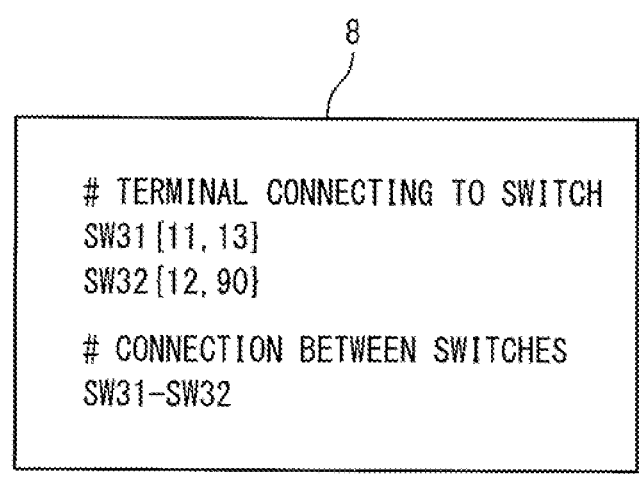
FIG. 11B is a view showing the topology file based on the topology shown in FIG. 11A.

On the other hand, when there is a route set in which does not overlap, for example, when the route AC and the route BD do not overlap as shown in FIG. 10, the topology detection part 5 judges that the known switch SW does not exist on the route BD and detects that the unknown terminal D is connected to the direction of the terminal B when it is viewed from the switch SW. Also, the route BD is detected to pass through a switch in the network b. As a result, the topology detection part 5 detects that the network 22 includes networks 24, 25 and a switch 32 connected to the switch 31. Also, the topology file 8 is updated so that the topology in which the terminals 12, 90 are connected through the networks 24, 25 to the switch 32, respectively, is the known topology 100 (refer to FIG. 11A and FIG. 11B).

Even when a route set other than the above-exemplified route sets does not overlap, the connection position of the unknown terminal 90 can be similarly detected.

As mentioned above, according to the present invention, by using the MAC address learning function that is generally used in the switch, it is possible to detect the connection position between the unknown terminal 90 and the known topology 100. As a result, even in a network that includes conventionally used switches, especially, a cheap switch that does not have many functions, the topology can be detected. From any terminal in a network that contains the topology detection apparatus 10, the topology can be detected.

Also, even when the number of terminals in a network is four or more, the topology of the four terminals can be obtained as mentioned above. Thus, by repeating the similar operations, the topology including all of the terminals can be detected. In the following, a method of determining the connection position of an unknown terminal D (not shown) to a known topology 100 having four known terminals (for example, the known topology 100 shown in FIG. 11A) is described. Here, a terminal set in which the topology is known is assumed to be U, and a known switch set is assumed to be S. Then, the known terminal set U includes the terminals 11, 12, 13 and 90, and the known switch set S includes the switches SW31, SW32.

The operation of the terminal for detecting the topology will be described below. At first, a topology in which potential switches are supposed for all of the known connections. Next, a set of routes between any two terminals including the unknown terminal D is selected to investigate the overlap between those routes. In the case of the above-mentioned method, the three terminals A, B and C are extracted from the four terminals 11, 12, 13 and 90. Then, the respective overlaps between the route AB and the route CD, between the route AC and the route BD and between the route BC and the route AD are investigated. This investigation is performed on all patterns. For example, the terminals 11, 12 and 13 are assumed to be the terminals A, B and C, respectively, and the overlaps between the route AB and the route CD, between the route AC and the route BD and between the route BC and the route AD are investigated as mentioned above. In succession, in a case that the terminals 12, 13 and 90 are assumed to be the terminals A, B and C, respectively, in a case that the terminals 13, 90 and 11 are assumed to be the terminals A, B and C, respectively and in a case that the terminals 90, 11 and 12 are assumed to be the terminals A, B and C, respectively, the overlaps between the route AB and the route CD, between the route AC and the route BD and between the route BC and the route AD are similarly investigated. Consequently, all of the patterns of the overlaps between the routes between the known terminals and between the known terminals and the unknown terminals can be investigated.

When the route AB and the route CD did not overlap, the route AB is judged not to include a switch to which the unknown terminal D is connected. However, since there is a possibility that the switch itself to which the terminal D is connected is unknown, the investigation is carried out under the assumption that the potential switch is supposed for the all known connections. The similar judgment is also performed on the route AC and the route BD, and the route BC and the route AD.

Here, let us assume that the set of the known switch set S and the potential switches is referred to as the candidate set CSWD. If the overlap does not exist between the investigated routes, the known switches and the potential switches included in the route to the unknown terminal D targeted for the investigation are removed from the candidate set CSWD. This is performed on the patterns of all of the route sets, and the switch remaining in the candidate set CSWD is determined to be the switch connected to the terminal D. At this time, when the switch connected to the terminal D is the potential switch, this is added to the known topology 100 as a new switch.

As mentioned above, even when the terminals in the known topology 100 are four or more, the connection position of the unknown terminal can be detected to determine the new topology.

2. Second Exemplary Embodiment

Figure 13A:
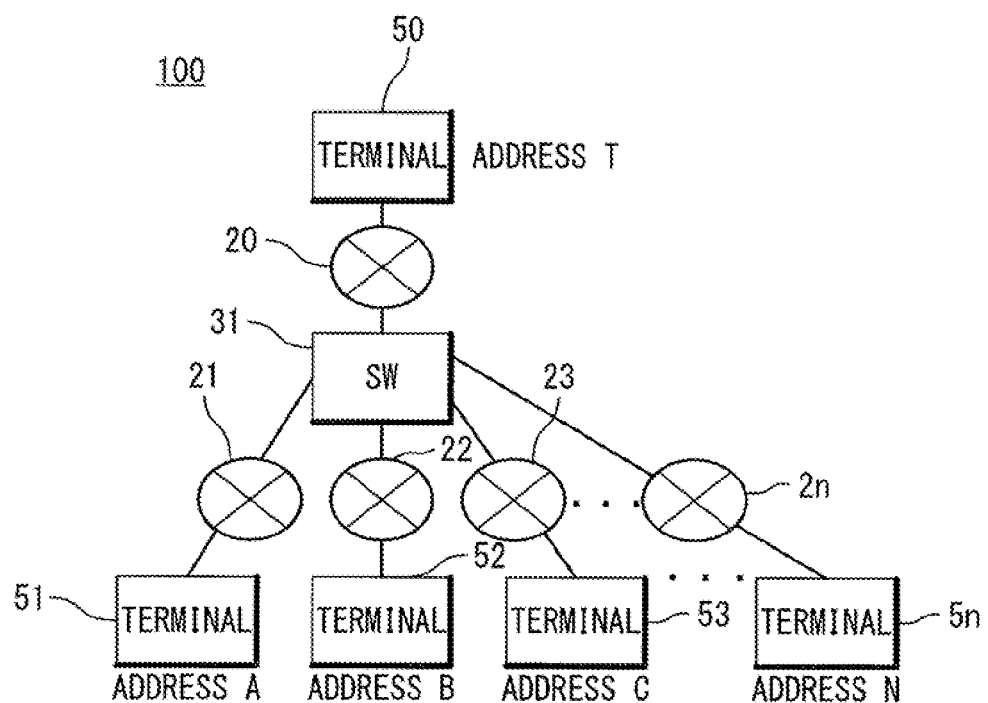
FIG. 13A is a view showing a known topology used to detect the topology, in the second exemplary embodiment.
Figure 13B:
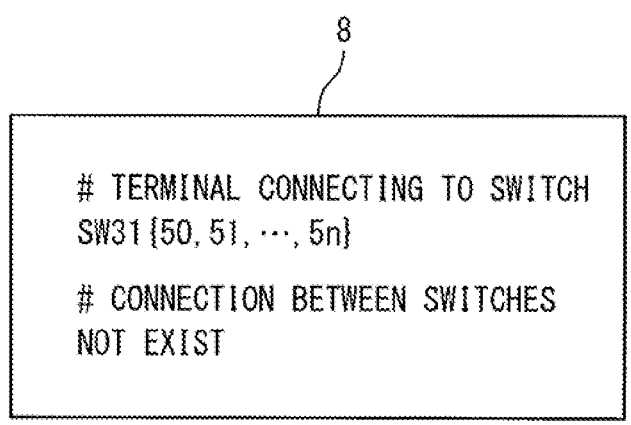
FIG. 13B is a view showing the topology file based on the topology shown in FIG. 13A.
Figure 14:
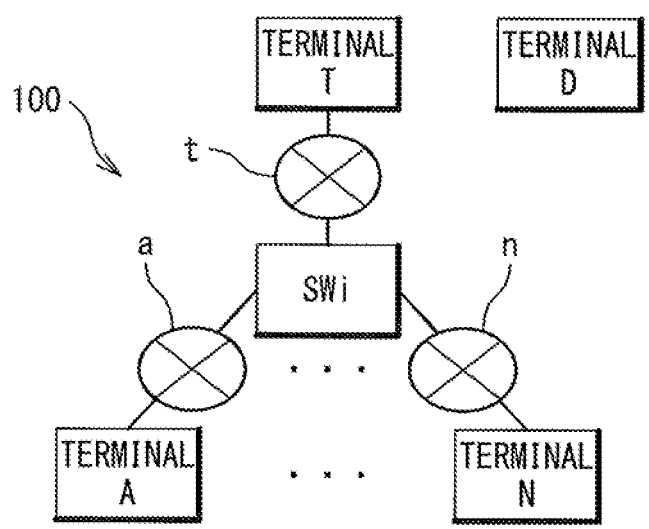
FIG. 14 is a view showing the terminal whose connection position in the known topology used to detect the topology is unknown, in the second exemplary embodiment.

A second exemplary embodiment will be described below with reference to FIG. 12 to FIG. 21B. In the second exemplary embodiment, a method is represented in which the number of times whether or not the routes between terminals passes through a same switch is investigated can be reduced, as compared with the first exemplary embodiment. Here, in the known topology 100 and the unknown terminal D that are shown in FIG. 14, one investigation terminal T serves as a transmission start point of an investigation packet, and a direction to which the unknown terminal D is connected when it is viewed from a switch SWi in the noted network is judged.

In the second exemplary embodiment, a method of determining the topology that is provided with n terminals 51 to 5n, an investigation terminal 50 and the terminal 90, which are included in the LAN, is described as one example. In the explanation here, the topology of the network, which includes the investigation terminal 50 and the terminals 51 to 5n as shown in FIG. 13A, is assumed to be the known topology 100, and the unknown terminal whose connection relation to the known topology 100 is not detected is assumed to be the terminal 90. With reference to FIG. 13A, the investigation terminal 50 and the terminals 51 to 5n are connected through a network 20 and networks 21 to 2n to the switch 31, respectively. The known topology 100 is a tree type topology in which the investigation terminal 50 serves as a parent, and the terminals 51 to 5n are any terminals, among descendant terminals connected to the ends or the networks 21 to 2n, respectively. In the tree network, only one switch 31 can exist, at which respective terminals are connected to different interfaces thereof. Also, the switch 31 is preliminarily assumed such that the respective terminals and MAC addresses are correlated and the respective terminals can communicate with each other.

Figure 12:
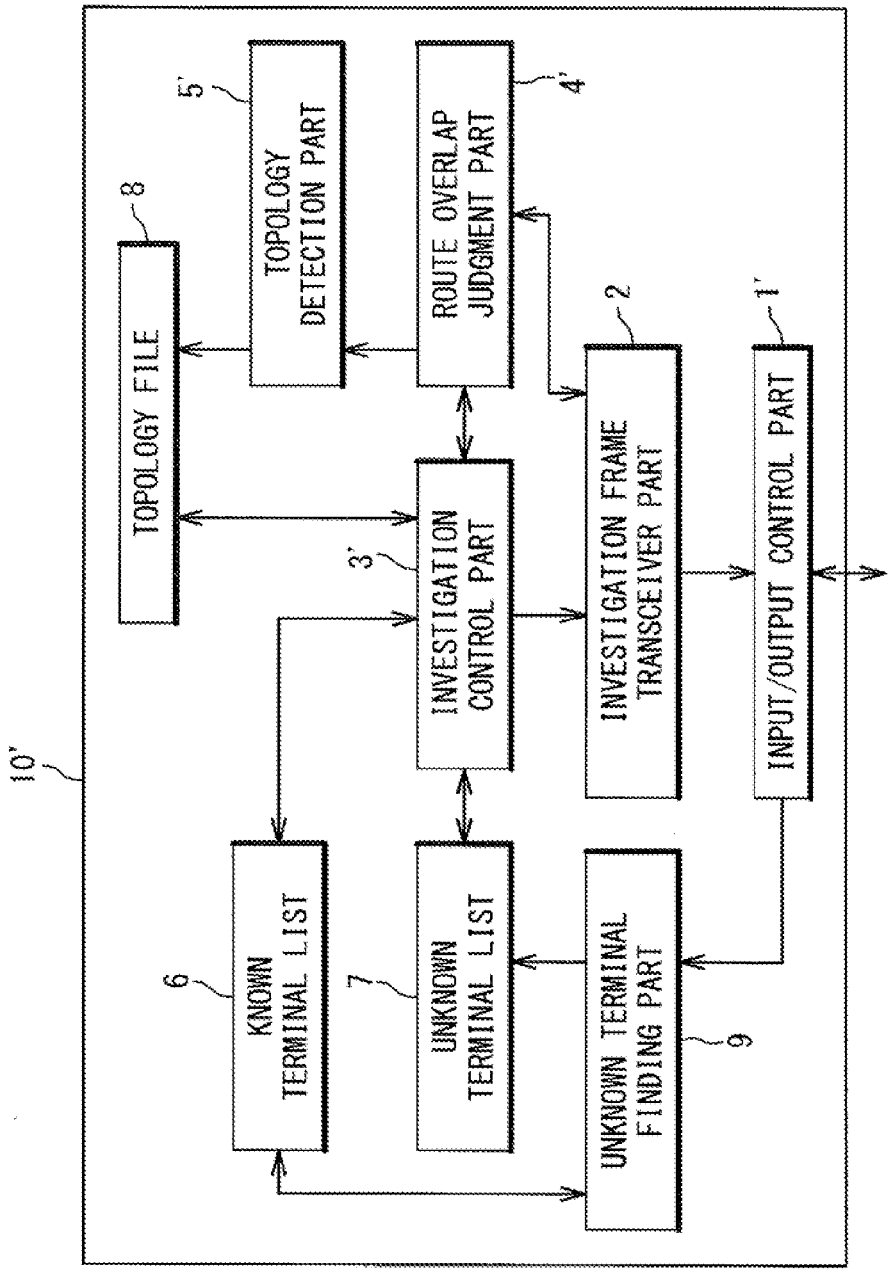
FIG. 12 is a configuration view showing a configuration in a second exemplary embodiment of the topology detection apparatus according to the present invention.

The investigation terminal 50 according to the present invention contains a topology detection apparatus 10' shown in FIG. 12. The topology detection apparatus 10' contains an input/output control part 1', the investigation frame transceiver part 2, the investigation control part 3', the route overlap judgment part 4', the topology detection part 5 and an unknown terminal finding part 9. Also, the topology detection apparatus 10 contains a storage device (not shown) that stores the known terminal list 6, the unknown terminal list 7 and the topology file 8. The input/output control part 1' controls the input/output of the frame/packet from/to the network. Also, the input/output control part 1' in the second exemplary embodiment passes a copy of a frame inputted from an external terminal to the unknown terminal finding part 9. The unknown terminal finding part 9 refers to the transmission source address of the packet passed from the input/output control part 1', and in a case of the terminal that does not exist in the known terminal list 6, registers the terminal in the unknown terminal list 7. The investigation frame transceiver part 2 generates, transmits and receives the investigation frame for investigating an overlap between routes. The investigation control part 3' manages the investigation procedure described later and instructs other investigation terminals to report a result of transmission and reception of a frame. The route overlap judgment part 4' judges the overlap between one set of routes in accordance with the reception state of the investigation frame. The topology detection part 5 determines the topology based on the overlap information of the routes and updates the known topology 100 written in the topology file 8.

The known terminal list 6 records the list of known terminals and switches which are included in the known topology 100. In the present case, the terminals 11, 12 and 13 and the switch 31 are recorded in the known terminal list 6. The unknown terminal list 7 records the list of terminals whose connection positions are unclear although their existences in the network are known. The input/output control part 1' in the second exemplary embodiment transfers a received frame to the unknown terminal finding part 9. The unknown terminal finding part 9 refers to the known terminal list 6 and when receiving a frame from a terminal that is not listed therein, adds the address of that terminal to the unknown terminal list 7. In this example, let us assume that the terminal 90 is registered as an unknown terminal in the unknown terminal list 7. The known topology 100 is recorded in the topology file 8. In the present case, as the topology file 8, the configuration elements and the connection relation between the respective configuration elements which represent the known topology 100 shown in FIG. 13A are recorded as shown in FIG. 13B. The topology file 8 records, for example, terminal names connected to each switch and the connection state between the switches (the existence or non-existence of the connection between the switches and the connected switch name).

Also, let us assume that the terminals 51 to 5n except the investigation terminal 50 in this exemplary embodiment perform a discarding process on a certain frame, or a PING server process for returning a response to a transmission source.

Next, a topology detection method according to a present invention will be described below. Hereafter, let us assume that addresses (IP addresses, MAC addresses) of the terminals 51, 52 and 53 are referred to as A, B and C for the convenience, and an address of the terminal 5n is referred to as N. Also, in the known terminal list 6 of the terminal 50, the terminals 51, 52, 53, . . . , 5n are assumed to be registered as 51, 52, 53, . . . , 5n, respectively.

The schema of the topology detection method in the second exemplary embodiment will be described below with reference to FIG. 3 and FIG. 14. At first, as shown in FIG. 14, the investigation terminal 50 determines the tree type topology, which includes the investigation terminal T as a parent and the terminals A, B, C, . . . , N connected to the switch SWi that serve as children of the investigation terminal T as the known topology 100 (Steps S101, S102). Next, the terminal D whose connection position in the known topology 100 is unknown is extracted, and the connection position between the unknown terminal D and the known topology is detected based on the existence or non-existence of the overlap between the route between any terminals in the known topology 100 and a route TD between the investigation terminal T and the unknown terminal D (Steps S103 to S106).

The operation of the determining process of the known topology at the steps S101 and S102 will be described below. The investigation control part 3' focuses the switch SWi serving as a child of the investigation terminal T in the tree topology in which the investigation terminal T serves as a parent. The investigation control part 3' stores the investigation terminal T as the parent of the switch SWi. For example, the investigation control part 3' focuses the switch 31 and stores the investigation terminal 50 as the parent of the switch 31. Next, the investigation control part 3' refers to the topology file 8 and lists the terminal and switch that are directly connected (as the children) to the switch except the parent, and stores them as a set. Here, when a switch is included in the set, the investigation control part 3' retrieves a terminal serving as the descendant of the switch from the topology file 8 and replaces the switch in the set with the terminal serving as the descendant. In the present case, as the set (the terminals A to N), the terminals 51 to 5n shown in FIG. 13A are registered. As mentioned above, the investigation terminal 50 determines the known topology 100 in which the investigation terminal 50 is the terminal T, the terminals 51, 52, 53, . . . , 5n and 90 are the terminals A, B, C, . . . and N, the network 20 is the network t, the networks 21, 22, 23, . . . and 2n are the networks a, b, c, . . . and n, and the switch 31 is the switch SWi.

Next, the investigation terminal 50 extracts the terminal D whose connection position is unknown (Step S103). In detail, the investigation control part 3' judges whether or not the terminal information is stored in the unknown terminal list 7, and if it is stored, the unknown terminal is extracted (Step S103). Here, when the terminal information is not stored in the unknown terminal list 7, the process is terminated. In this exemplary embodiment, since the terminal 90 exists in the unknown terminal list 7, the terminal 90 is selected as the unknown terminal D. A topology detection part 5' refers to the set of the terminals in the known topology 100 and determines that the unknown terminal 90 is a child connected to the switch 31 when the set is composed of one terminal, and adds the terminal 90 to the terminal list in the topology file which is the list of the terminals connected to the switch 31, and the process is terminated. If two or more terminals are included in the set, the processing flow proceeds to a step S104.

The investigation terminal 50 detects the connection position between the unknown terminal D and the known topology, in accordance with the existence or non-existence of the overlap of the routes between the terminals in the known topology 100 and the unknown terminal D (Steps S104 to S106). At the step S104, the investigation control part 3' selects the route TD between the investigation terminal T and the terminal D and the route between any two terminals in the set (the terminals A to N), and instructs the route overlap judgment part 4' to investigate the overlap between these two routes. In the present case, the route overlap between the route TD between the investigation terminal 50 and the terminal 90 and the route between any two terminals among the terminals 51 to 5n is investigated.

Figure 15:
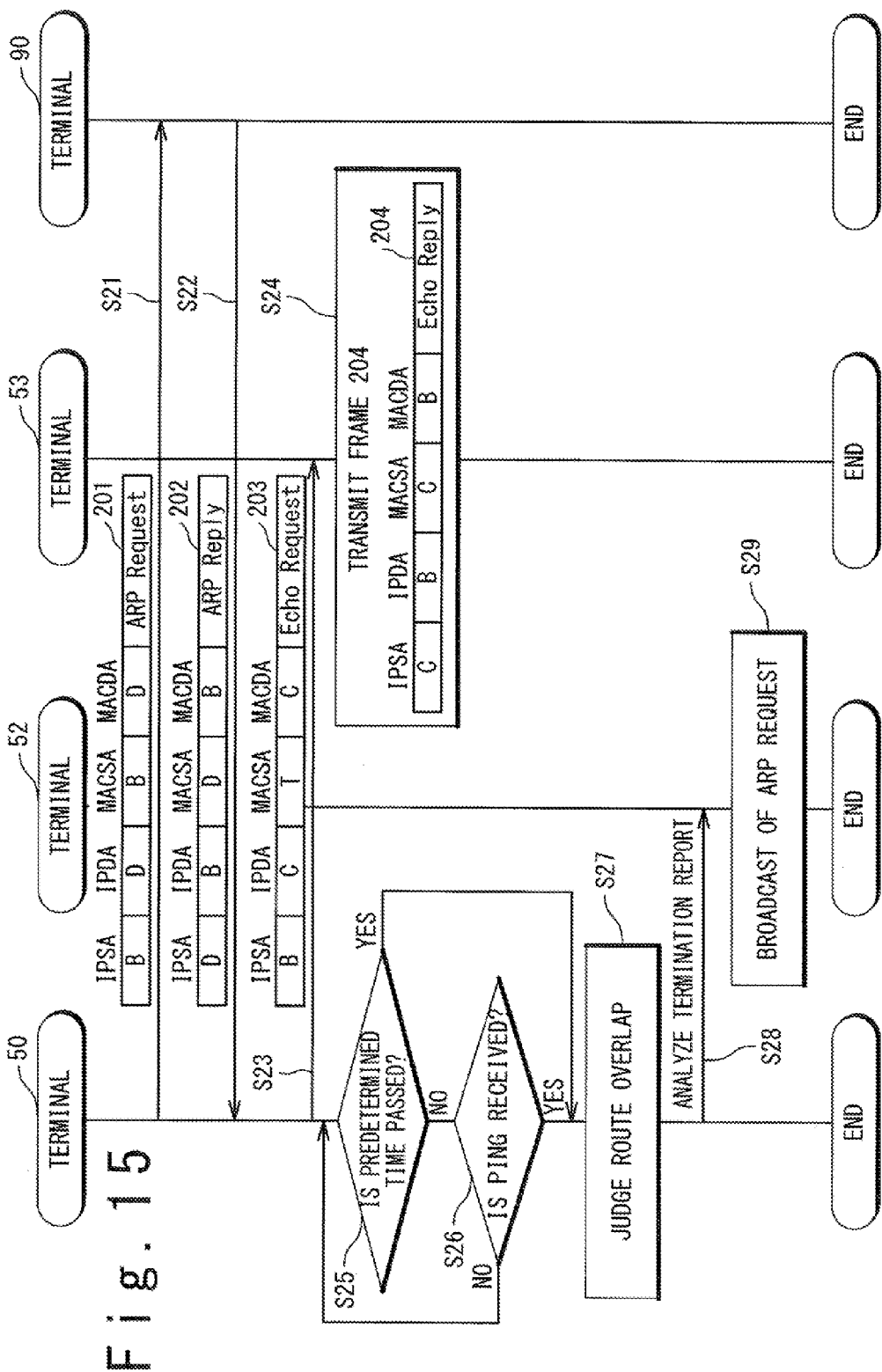
FIG. 15 is a sequence diagram showing the second exemplary embodiment of the operation for investigating the overlap state of the routes, in the network according to the present invention.

The overlap judging process for the route set in the second exemplary embodiment will be described below in detail with reference to FIG. 14 to FIG. 21B. Here, a case of judging the overlap between the route TD between the terminal 50 and the terminal 90 and the route BC between the terminal 52 and the terminal 53 is described. FIG. 15 is a sequence diagram showing the operation of the overlap judging process between the route TD and the route BC in the second exemplary embodiment.

In the topology detection method in the second exemplary embodiment, by the control from one investigation terminal 50, the switch on the route TD is instructed to learn the MAC address for the investigation. In this state, the investigation terminal 50 issues a PING request for instructing the terminal 53 in the set to reply PING to the other terminal 52. Then, the existence or non-existence of the overlap between the route TD and the route BC is judged on the basis of the reception state of the PING in the investigation terminal 50. This will be described below in detail.

With reference to FIG. 15, the route overlap judgment part 4' in the terminal 50 requests the investigation frame transceiver part 2 to transmit a frame 201 for investigation to the terminal 90 (Step S21). Here, the frame 201 is the frame including the unicast ARP request. Then, an address B of the terminal 52 is set as the transmission source address (IP address, MAC address), and an address D of the terminal 90 is set as the destination address (IP address, MAC address). Consequently, when the switch is located on the route TD from the terminal 50 to the terminal 90, the switch learns to transfer the frame addressed to the terminal 52 (address B) to the direction of the terminal 50. The terminal 90, after receiving the frame 201, replies a frame 202 addressed to the terminal 52 (Step S22). The terminal 90, after receiving the frame 201, discards this frame.

Next, the route overlap judgment part 4' in the terminal 50 sends a frame 203 to the terminal 53 as the PING request (Step S23). The frame 203 includes an ICMP (Internet Control Message Protocol) Echo request, and the address B of the terminal 52 is set as a transmission source IP address, and an address T of the investigation terminal 50 is set as a transmission source MAC address, and an address C of the terminal 53 is set as a destination address (IP address, MAC address). The terminal 53 replies a PING reply, in response to the PING request by the frame 203 (Step S24). At this time, the terminal 53 recognizes that the received PING request is transmitted from the terminal 52, and sends a frame 204 as the PING reply to the terminal 52. That is, the frame 204 includes the ICMP Echo reply, the address C of the terminal 53 is set as the transmission source address (IP address, MAC address), and the address B of the terminal 52 is set as the destination address (IP address, MAC address).

After the step S23, the investigation terminal 50 accepts the reception of the frame 204 receives the reception of a frame 204 for a predetermined time (Steps S25 No, S26). On the basis of whether or not the frame 204 is received in this period, the route overlap judgment part 4' judges whether or not the route TD and the route BC overlap (Step S27). If the frame 204 is received within the predetermined time (Steps S25 No, S26 Yes), it is indicated that the frame 204 addressed to the terminal 52 passes through the switch on the route TD in which the MAC address is changed. In this case, the route overlap judgment part 4' judges that the route TD and the route BC overlap. If the frame 204 is not received within the predetermined time (Step S25 Yes), the route overlap judgment part 4' judges that the route TD and the route BC do not overlap. By taking the possibility that the frame is lost in the network into account, an exemplary embodiment in which the terminal 50 sends the plurality of frames 203 is also possible. Also, there is a possibility that the learning state of the MAC address is changed by a frame except the frame for the investigation. Thus, it is possible to use a method in which the above-explained overlap judgment is repeated a plurality of times, and adopts the investigation result only when the obtained results are the same.

When the overlap judging process is terminated, the investigation terminal 50 issues an analysis termination report to the terminal 52 (Step S28). The terminal 52 broadcasts the frames including the ARP request to the terminals 51 to 5*n* and 90 and returns the MAC address table of the switches between them to a usual transfer mode (Step S29). The destination terminal of the analysis termination report is not limited to the terminal 52 in the case of the terminal except the terminal 53.

Figure 16:
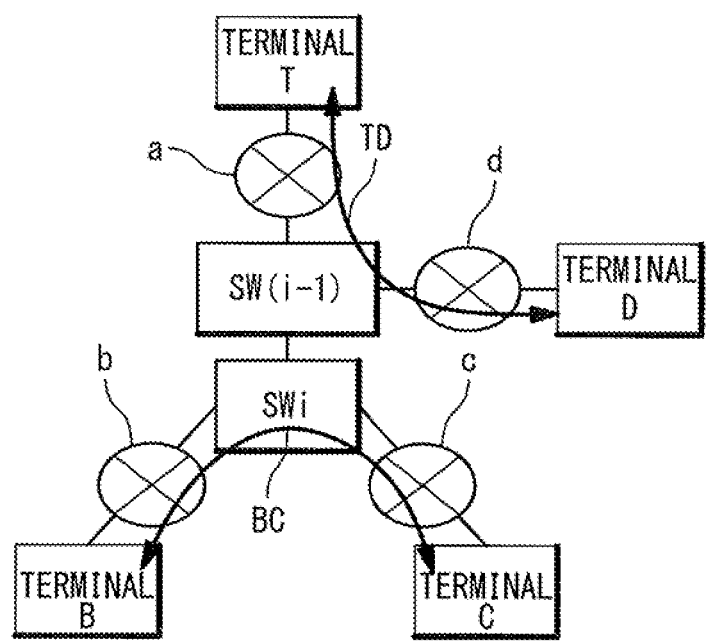
FIG. 16 is a view showing a case in which a route TD and a route BC do not overlap.
Figure 17A:
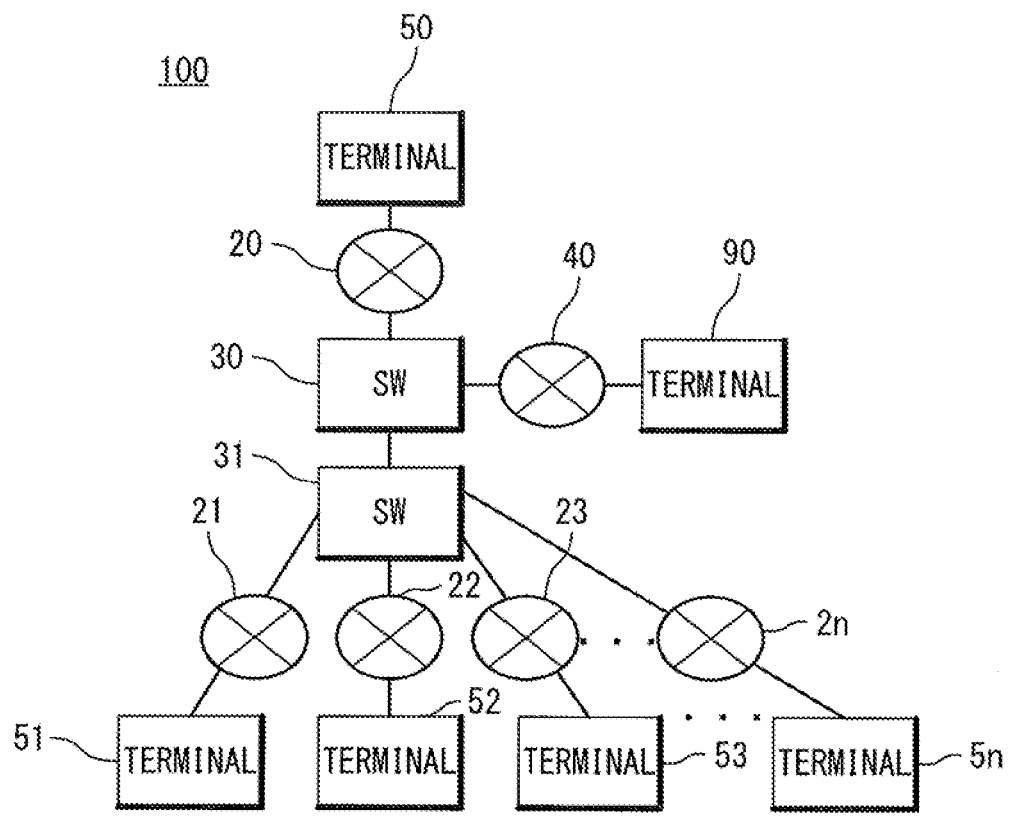
FIG. 17A is a view showing the topology in which the route TD and the route BC do not overlap.
Figure 17B:
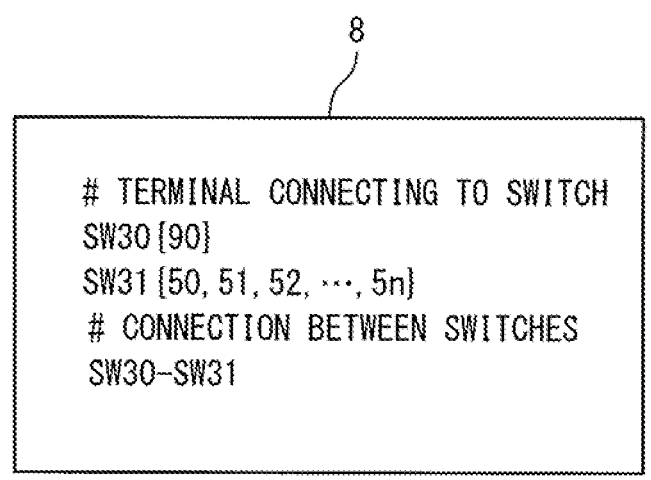
FIG. 17B is a view showing the topology file based on the topology shown in FIG. 17A.

As explained above, the route overlap judgment part 4' in the second exemplary embodiment can judge the existence or non-existence of the overlap between the route TD between the unknown terminal and the route between any two terminals in the known topology 100. Here, if the route BC and the route TD are judged not to overlap, the topology detection part 5' judges that, as shown in FIG. 16, the terminal D is not a child of the switch SWi and is a child of a switch SW(i−1) that is newly added between the parent (investigation terminal T) and the switch SWi. In detail, with reference to FIG. 14, the set (the terminals A to N) is the descendant of the switch SWi, and they are connected through different networks to the switch SWi. Therefore, the route between two terminals among the terminals A to N necessarily passes through the switch SWi and does not pass through the network t in the parent direction when it is viewed from the switch SWi. Consequently, if the route between two terminals among the terminals A to N and the route TD do not overlap, the topology detection part 5' judges that the terminal D is not a child of the switch SWi and is a child of the switch SW(i−1) which is newly added between the parent (investigation terminal 50) and the switch SWi. In this case, the topology detection part 5' places a new switch 30 between the network 20 and the switch 31 as shown in FIG. 17A, and registers the topology in which the terminal 90 is connected through a network 40 to the switch 30, as the new known topology 100. The topology file 8 of this time is updated as shown in FIG. 17B.

On the other hand, if the route TD and the route BD are judged to overlap, the processing flow returns to the step S104 and the route for judging the overlap is selected again. At this time, the route overlap judgment part 4' selects any two terminal K and terminal L from the terminals 51 to 5*n* and judges the existence or non-existence of the overlap between the route KD between the terminal K and the unknown terminal D and the route TL between the investigation terminal T and the terminal L. For example, the terminal 52 is selected as the terminal K, and the terminal 53 is selected as the terminal L.

The investigation terminal 50 investigates the overlap between the route KD and the route TL, similarly to the steps S21 to 29. At this time, the frame 201 is sent to the terminal 53, and when the switch is located on the route TL, the switch is instructed to learn to transfer the frame addressed to the terminal 52 to the investigation terminal 50. Further, the investigation terminal 50 transmits the PING request (the frame 203 in which the destination address is an address D) to the unknown terminal 90 and investigates the overlap between the route KD and the route TL, on the basis of the existence or non-existence of the reception of the PING reply from the terminal 90.

Figure 18:
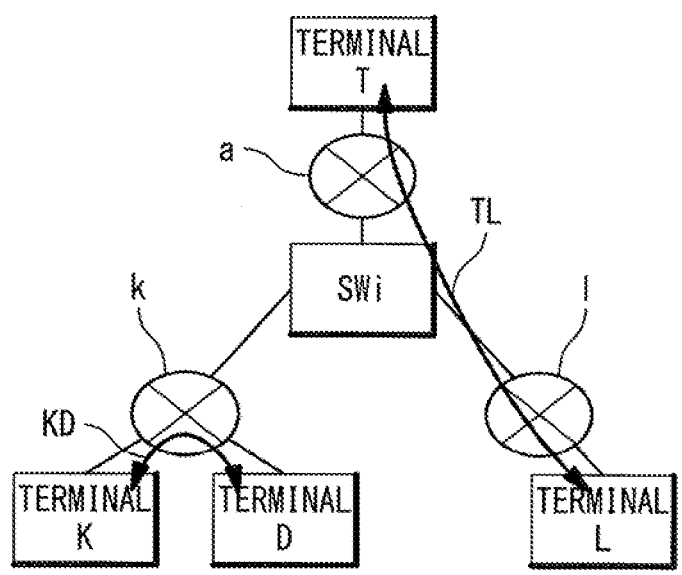
FIG. 18 is a view showing a case in which a route TL and a route KD do not overlap.
Figure 19A:
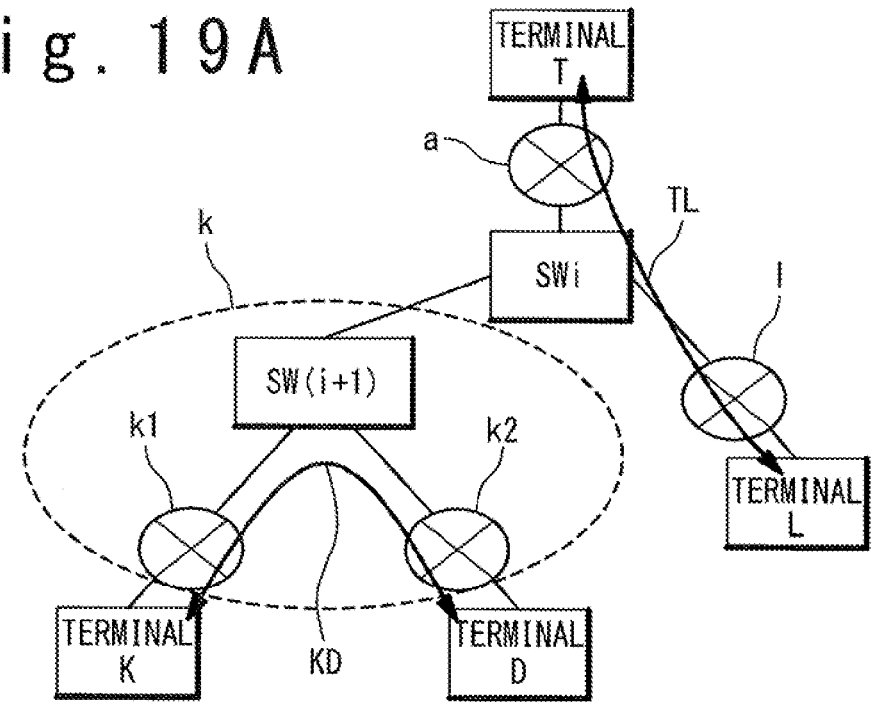
FIG. 19A is a view showing the topology when the route TL and the route KD do not overlap.
Figure 20A:
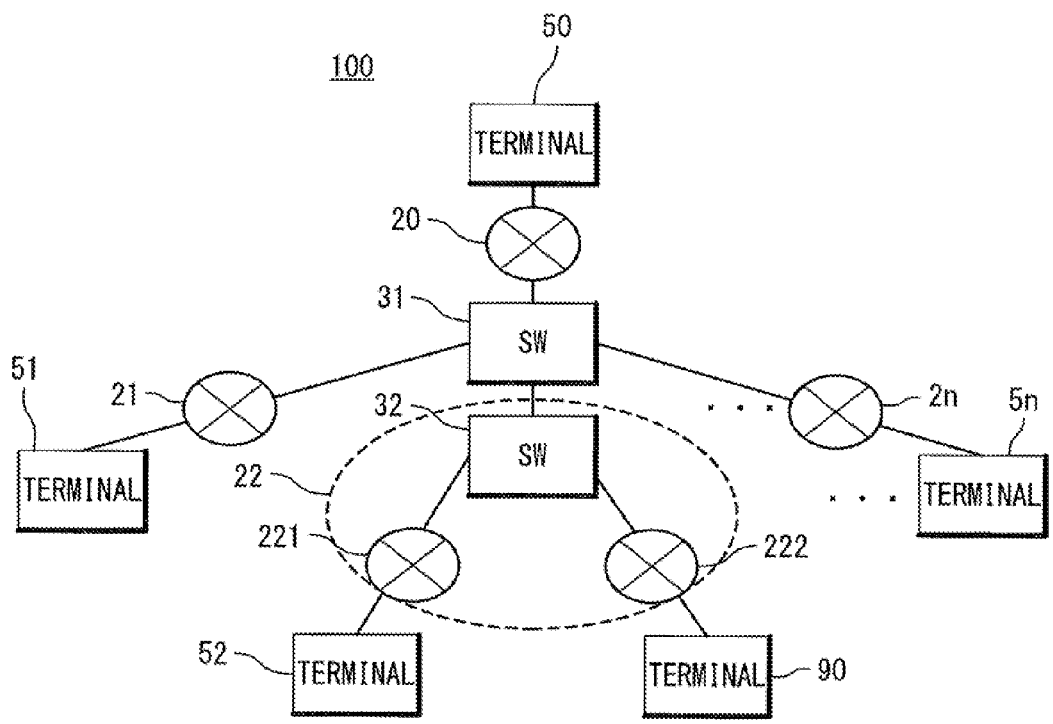
FIG. 20A is a view showing the topology when the route TL and the route KD do not overlap.
Figure 20B:
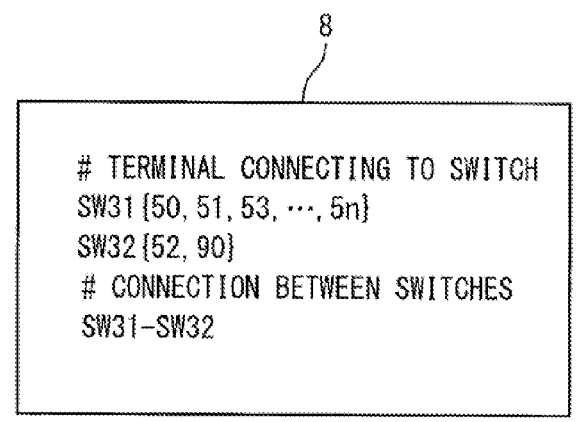
FIG. 20B is a view showing the topology file based on the topology shown in FIG. 20A.

Here, if the route KD and the route TL are judged not to overlap, the topology detection part 5' judges that as shown in FIG. 18, the terminal D (50) is connected to the switch SWi (31) through a network k in the same direction as the terminal K (52). Also, when the terminal K (52) is a child directly connected to a switch in the network k, as shown in FIG. 19A, a switch SW(i+1) is added in the network k, the terminal K (52) and the terminal D (90) are connected as children of the switch SW(i+1), and the known topology 100 is updated. In this case, in addition to the switch SW(i+1), a network k1 which connects the switch SW(i+1) and the terminal K (52) and a network k2 which connects the switch SW(i+1) and the terminal D (90) are added to the network k. With reference to FIG. 20A, FIG. 20B, in such a case, in this example, the switch 32 connected to the switch 31 is added to the known topology 100. That is, the known topology 100 and the topology file 8 are updated such that the terminals 52, 90 are connected through networks 221, 222 corresponding to the networks k1, k2, to the switch 32 corresponding to the switch SW (i+1), respectively.

On the other hand, when the terminal K (52) is not a child directly connected to the switch in the network k, the investigation control part 3' stores the switch SWi as a parent and stores the switch SW (i+1), which is connected as a child in the same direction as the terminal K (52) when it is viewed from the switch SWi, as the newly-focused switch. Also, the investigation control part 3' stores the known terminals, which are connected to the switch SW (i+1) as the child, as the set (the terminals A to N). Hereafter, the connection position of the unknown terminal D is detected similarly to the steps S103 to S106.

Figure 19B:
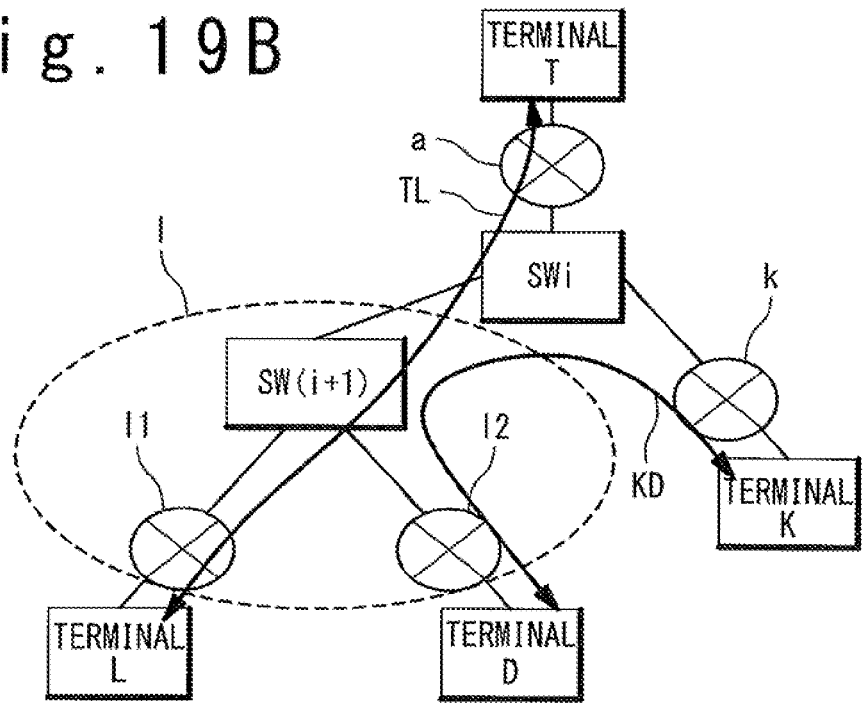
FIG. 19B is a view showing the topology when the route TL and the route KD overlap.

Also, if the route KD and the route TL are judged to overlap, as shown in FIG. 19B, the terminal D (90) can be judged not to exist in the same direction as the terminal K (52)

Figure 21A:
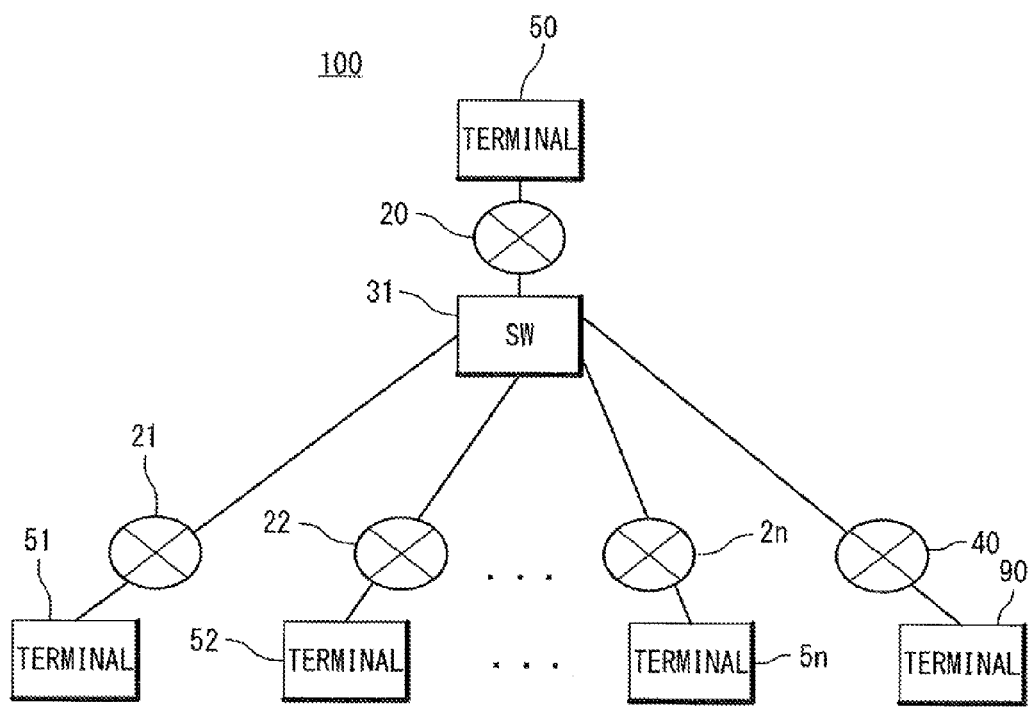
FIG. 21A is a view showing the topology when all of the verified routes TL and routes KD overlap.
Figure 21B:
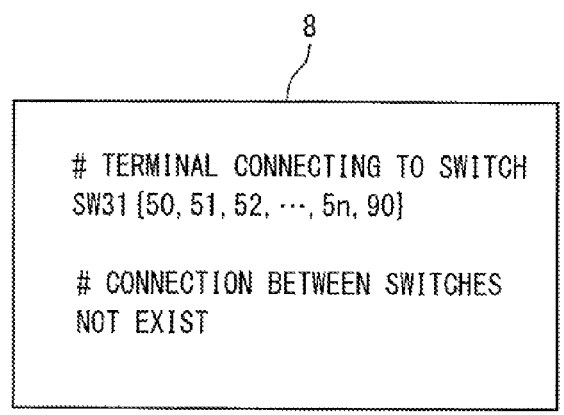
FIG. 21B is a view showing the topology file based on the topology shown in FIG. 21A.

(it is not connected to the same network k). At this time, the investigation control part 3' adds the terminal 52 focused as the terminal K to the already-focused terminal list (not shown) and selects the new terminal K from the set (the terminals 51 to 5*n*). The new terminal K is the terminal other than the terminal L and also the terminal that does not exist in the already-focused list. Here, when a new terminal K cannot be selected, any terminal among the terminals other than the terminal L is selected as the new terminal L, and similarly to the foregoing cases, the existence or non-existence of the overlap between the route KD and the route TL is verified, thereby detecting the topology. Also, when a new terminal K cannot be selected and the new terminal L is already selected, all of the verified routes KD and routes TL are known to overlap. As a result, as shown in FIG. 21A, the terminal 90 is detected to be connected as a child of the switch 31 through the unknown new network 40. The topology detection part 5' updates the known topology 100 and the topology file 8 and terminates the process, as shown in FIG. 21A, FIG. 21B.

As explained above, according to the topology detection method of the second exemplary embodiment, the response of the PING is used to judge the overlap between the routes. Thus, the topology can be detected by one investigation terminal 50. Also, similarly to the first exemplary embodiment, the MAC address learning function in the switch is used to detect the topology. Hence, even in a network including a switch that does not have the high function, the topology can be detected.

Some exemplary embodiments of the present invention have been described above in detail. However, the specific configuration is not limited to the above-mentioned exemplary embodiments. Even some changes are applied to them in a range without departing from the scope of the present invention, it is included in the present invention. In the first and second exemplary embodiments, the unicast ARP is used to investigate the overlap between the routes. However, it is not limited thereto. For example, instead of the unicast ARP, any packet may be used to change the transfer destination of the switch on the route. However, when a possibility that the timeout of an ARP cache causes the ARP request to be transmitted or a possibility that the response of this reset packet or the like is performed is considered, it is preferable to use the unicast ARP and carry out the MAC address learning, such as the first and second exemplary embodiments. Also, in the second exemplary embodiment, the overlap between the routes is judged in accordance with the response of the PING that uses ICMP Echo. However, it is not limited thereto. If the response to a signal from the investigation terminal 50 is transmitted, a different protocol may be used. For example, at the step S23, the investigation terminal 50 may issue a connection opening request (SYN) in TCP (Transmission Control Protocol) instead of the frame 203 and judge the overlap between the routes in accordance with the reception state of the response (SYN ACK) from the terminal 53. Or, at the step S23, the investigation terminal 50 may transmit any frame and judge the existence or non-existence of the overlap between the routes in accordance with the reception state of the response frame executed by the ECHO server set for the terminal 53.

This application is the National Phase of PCT/JP2009/068184, filed Oct. 22, 2009, which claims the priority based on Japanese Patent Application Number 2008-291812, and the disclosure content in Japanese Patent Application Number 2008-291812 is incorporated in this application by this citation.

The invention claimed is:

1. A topology detection method comprising:
    selecting a first route between a first terminal and a second terminal and a second route between a third terminal and a fourth terminal;
    judging an existence or non-existence of an overlap of the first route and the second route; and
    determining a network topology of a network based on the existence or non-existence of an overlap of the first route and the second route,
    wherein the judging the existence or non-existence of the overlap comprises:
    instructing a switch on the second route to learn to transfer a frame addressed to a predetermined terminal to the third terminal,
    instructing a switch on the first route to learn to transfer the frame addressed to the predetermined terminal to the first terminal after the learning of the switch on the second route;
    transmitting the frame addressed to the predetermined terminal from the fourth terminal; and
    performing a judgment of the overlap of the first route and the second route based on a terminal which receives the frame addressed to the predetermined terminal,
    wherein the judging the existence or non-existence of the overlap comprises:
    the third terminal transmitting a first frame whose source address is the predetermined terminal to the fourth terminal;
    the first terminal transmitting a second frame whose source address is the predetermined terminal to the second terminal after the transmitting of the first frame;
    the fourth terminal transmitting a third frame addressed to the predetermined terminal; and
    judging that the first route and the second route are overlapped to each other when a terminal receiving the third frame is the first terminal.

2. The topology detection method according to claim 1, wherein the address of the predetermined terminal is not used in the network.

3. A topology detection method comprising:
    selecting a first route between a first terminal and a second terminal and a second route between a third terminal and a fourth terminal;
    judging an existence or non-existence of an overlap of the first route and the second route; and
    determining a network topology of a network based on the existence or non-existence of an overlap of the first route and the second route,
    wherein the judging the existence or non-existence of the overlap comprises:
    instructing a switch on the second route to learn to transfer a frame addressed to a predetermined terminal to the third terminal,
    instructing a switch on the first route to learn to transfer the frame addressed to the predetermined terminal to the first terminal after the learning of the switch on the second route,
    transmitting the frame addressed to the predetermined terminal from the fourth terminal; and
    performing a judgment of the overlap of the first route and the second route based on a terminal which receives the frame addressed to the predetermined terminal,
    wherein the selecting the first route and the second route comprises:
    selecting a known network topology including the first terminal, the third terminal, and the fourth terminal; and extracting the second terminal whose connection position in the known network topology is unknown as an unknown terminal, and the determining the network topology comprises:
   detecting the connection position of the unknown terminal in the known network topology based on the existence or non-existence of the overlap between the first route and the second route.

4. The topology detection method according to claim 3, wherein in the known network topology, the first terminal, the third terminal, and the fourth terminal are connected to a first switch via respective networks that are different from each other, and the determining the network topology comprises:
   detecting a network arranged between the first switch and the unknown terminal based on the existence or non-existence of the overlap of the first route and the second route.

5. The topology detection method according to claim 4, wherein the determining the network topology comprises:
   judging that the unknown terminal is connected to the first switch via a network arranged between the first switch and the first terminal when the first route and the second route do not overlap.

6. The topology detection method according to claim 5, wherein the determining the network topology comprises:
   judging that the unknown terminal is connected to the first switch via a network other than a network arranged between the first switch and the first terminal when the first route and the second route overlap.

7. The topology detection method according to claim 6, wherein the determining the network topology comprises:
   judging that the unknown terminal is connected to the first switch via a new network when the unknown terminal is judged to be not connected to any networks connected to the first switch in the known network topology.

8. A topology detection apparatus comprising:
   a route overlap judgment part configured to judge an existence or non-existence of an overlap between a first route between a first terminal and a second terminal and a second route between a third terminal and a fourth terminal;
   a topology detection part configured to determine a network topology of a network based on an existence or non-existence of an overlap between the first route and the second route; and
   an investigation frame transceiver part,
   wherein the route overlap judgment part is configured to issue a transmission request to instruct the third terminal to transmit a first frame whose source address is an address of a predetermined terminal to the fourth terminal, the investigation frame transceiver part is configured to transmit a second frame whose source address is the address of the predetermined terminal to the second terminal after the issuing of the transmission request; and the route overlap judgment part is configured to judge that the first route and the second route are overlapped to each other when the investigation frame transceiver part receives from the fourth terminal a third frame having a destination address that is the address of the predetermined terminal.

9. The topology detection apparatus according to claim 8, wherein the route overlap judgment part is configured to select a known network topology including the first terminal, the third terminal, and the fourth terminal, and to extract the second terminal whose connection position in the known network topology is unknown as an unknown terminal, and the topology detection part is configured to detect the connection position of the unknown terminal to the known network topology based on the existence or non-existence of the overlap between the first route and the second route.

10. The topology detection apparatus according to claim 9, wherein in the known network topology, the first terminal, the third terminal, and the fourth terminal are connected to a first switch via respective networks that are different from each other, and the topology detection part is configured to detect a network arranged between the first switch and the unknown terminal based on the existence or non-existence of the overlap of the first route and the second route.

11. The topology detection apparatus according to claim 10, wherein the topology detection part is configured to judge that the unknown terminal is connected to the first switch via a network arranged between the first switch and the first terminal when the first route and the second route do not overlap.

12. The topology detection apparatus according to claim 10, wherein the topology detection part is configured to judge that the unknown terminal is connected to the first switch via a network other than a network arranged between the first switch and the first terminal when the first route and the second route overlap.

13. The topology detection apparatus according to claim 10, wherein the topology detection part is configured to judge that the unknown terminal is connected to the first switch via a new network when the unknown terminal is judged to be not connected to any networks connected to the first switch in the known network topology.

14. The topology detection apparatus according to claim 8, wherein the address of the predetermined terminal is not used in the network.

* * * * *